(12) United States Patent
Lotter et al.

(10) Patent No.: US 8,139,608 B2
(45) Date of Patent: *Mar. 20, 2012

(54) METHOD AND APPARATUS OPTIMIZING A RADIO LINK

(75) Inventors: Michiel Petrus Lotter, San Diego, CA (US); Pieter van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 694 days.

This patent is subject to a terminal disclaimer.

(21) Appl. No.: 12/198,283

(22) Filed: Aug. 26, 2008

(65) Prior Publication Data

US 2008/0316965 A1 Dec. 25, 2008

Related U.S. Application Data

(63) Continuation of application No. 11/738,869, filed on Apr. 23, 2007, now Pat. No. 7,418,008, which is a continuation of application No. 10/371,237, filed on Feb. 19, 2003, now Pat. No. 7,218,645.

(60) Provisional application No. 60/358,422, filed on Feb. 19, 2002.

(51) Int. Cl.
*H04J 3/16* (2006.01)

(52) U.S. Cl. .................................. 370/469; 370/466

(58) Field of Classification Search .......... 370/254–258
See application file for complete search history.

(56) References Cited

U.S. PATENT DOCUMENTS

| | | | |
|---|---|---|---|
| 5,687,290 A | 11/1997 | Lewis | |
| 5,914,980 A | 6/1999 | Yokota et al. | |
| 6,236,365 B1 | 5/2001 | LeBlanc et al. | |
| 6,434,129 B1 | 8/2002 | Struhsaker et al. | |
| 6,515,972 B1 | 2/2003 | Gage et al. | |
| 6,542,481 B2 | 4/2003 | Foore et al. | |
| 6,542,490 B1 | 4/2003 | Ahmadvand et al. | |
| 6,594,246 B1 | 7/2003 | Jorgensen | |
| 6,766,309 B1 | 7/2004 | Cheng et al. | |
| 6,785,227 B1 | 8/2004 | Lu et al. | |
| 7,042,905 B1 | 5/2006 | Johnson | |
| 7,218,645 B2 | 5/2007 | Lotter et al. | |
| 7,266,086 B2 | 9/2007 | Li | |
| 7,418,008 B2 | 8/2008 | Lotter et al. | |
| 7,609,652 B2 | 10/2009 | Kellerer et al. | |
| 7,953,021 B2 | 5/2011 | Lotter et al. | |
| 2002/0071480 A1 | 6/2002 | Marjelund et al. | |
| 2003/0012161 A1 | 1/2003 | Cayla et al. | |

(Continued)

OTHER PUBLICATIONS

Kallel, Samir, Analysis of Memory and Incremental Redundancy ARQ Schemes Over a Nonstationary Channel, IEEE Transactions on Communications, vol. 40, No. 9, Vancouver, Canada, pp. 1474-1480 (Sep. 1992).

(Continued)

*Primary Examiner* — Ricky Ngo
*Assistant Examiner* — Ben Liu
(74) *Attorney, Agent, or Firm* — Sterne, Kessler, Goldstein & Fox P.L.L.C.

(57) ABSTRACT

Optimizing a radio link is done by acquiring at least OSI layer one and two performance measurements, determining an optimum setting collection for at least OSI layer three to a top layer, then configuring at least the OSI layer three to the top layer based upon the optimum setting collection. The top layer is at least OSI layer four. The invention includes optimized radio links, methods of making optimized radio links, revenue generating making optimized radio links by providing means for optimizing the radio link.

24 Claims, 20 Drawing Sheets

U.S. PATENT DOCUMENTS

| | | |
|---|---|---|
| 2003/0092464 A1 | 5/2003 | Li |
| 2003/0152095 A1 | 8/2003 | Foore et al. |
| 2003/0219034 A1 | 11/2003 | Lotter et al. |
| 2004/0072577 A1 | 4/2004 | Myllymaki et al. |
| 2004/0081248 A1 | 4/2004 | Parolari |
| 2004/0153706 A1 | 8/2004 | Cayla |
| 2007/0189227 A1 | 8/2007 | Lotter et al. |
| 2007/0206634 A1 | 9/2007 | Lotter et al. |
| 2008/0316965 A1 | 12/2008 | Lotter et al. |

OTHER PUBLICATIONS

Ludwig, Reiner and Katz, H. Randy, The Eifel Algorithm: Marking TCP Robust Against Spurious Retransmissions, ACM SIGCOMM Computer Communication Review, vol. 30, Issue 1, pp. 30-36 (Jan. 2000).

Berggren, Fredrik, Distributed Power Control for Throughput Balancing in CDMA Systems, 2001 $12^{th}$ IEEE Int'l Symposium on Personal, Indoor and Mobile Radio Communications, vol. 1, pp. C24-C28 (Sep. 2001).

Caceres, Ramon and Iftode Liviu, Improving the Performance of Reliable Transport Protocols in Mobile Computing Environments, IEEE Journal on Selected Areas in Communications, vol. 13, No. 5, pp. 850-857 (1995).

Bakre, Ajay V., Design and Implementation of Indirect Protocols for Mobile Wireless Environments, New Brunswick, New Jersey, Rutgers—The State University of New Jersey, 192 pages (Oct. 1996).

Brown, Kevin and Singh, Suresh, M-TCP: TCP for Mobile Cellular Networks, 25 pages (Jul. 29, 1997).

Ludwig, Reiner; Rathonyi, Bela; Konrad, Almudena; Oden, Kimberly and Joseph, Anthony; Multi-Layer Tracing of TCP over a Reliable Wireless Link, ACM SIGMETRICS Performance Evaluation Review, vol. 27, Issue 1, pp. 144-154 (Jun. 1999).

P. Cherriman and L. Hanzo, Error-Rate Based Power-Controlled Multimode H.263-Assisted Video Telephony, IEEE Trans. of Vehicular Technology, vol. 48, Issue 5, pp. 1726-1738 (Sep. 1999).

Polyzos, C. George, Mobile Multimedia Lab, Supporting Quality of Service in the Wireless Internet, 1ST Mobile Venue 2002, Athens, 11 pages (May 30-31, 2002).

Balakrishnan Hari; Padmanabhan, N. Venkata; Seshan, Srinivasan, Seshan and Katz, H. Randy, A Comparison of Mechanisms for Improving TCP Performance over Wireless Links, Conference Proceedings on Applications, Technologies, Architectures, and Protocols for Computer Communication, Palo Alto, California, pp. 256-269 (Aug. 28-30, 1996).

Bakre, A.V. and Badrinath, B.R., Implementation and Performance Evaluation of Indirect TCP, IEEE Transactions on Computers, vol. 46, No. 3, pp. 260-278 (Mar. 1997).

Zorzi, Michele; Rossi, Michele and Mazzini, Gianluca, Throughput and Energy Performance of TCP on a Wideband CDMA Air Interface, Journal of Wireless Communications and Mobile Computing, vol. 2, Issue 1, 71-84 (2001).

METHOD AND APPARATUS OPTIMIZING A RADIO LINK

The present application is a CONTINUATION of U.S. application Ser. No. 11/738,869, filed Apr. 23, 2007, now U.S. Pat. No. 7,418,008, which is a CONTINUATION of U.S. application Ser. No. 10/371,237, filed Feb. 19, 2003, now U.S. Pat. No. 7,218,645.

Said U.S. application Ser. No. 10/371,237 claims benefit from and priority to U.S. Application No. 60/358,422, filed Feb. 19, 2002.

The above-identified applications are hereby incorporated by reference herein in their entirety.

The present application is related to U.S. application Ser. No. 11/745,718, filed May 8, 2007, now U.S. Pat. No. 7,953,021; and U.S. Application No. 13/149,472, filed May 31, 2011.

TECHNICAL FIELD

This invention relates to optimization of a radio link in terms of at least some of the following: power efficiency, bandwidth delivery, energy consumption, channel noise, and overall performance of multi-layer network communications through the radio link.

BACKGROUND ART

Mobile multimedia communication is desired by many, whether in the form of video telephone calls, video conferencing, mobile reception of web casts of audio and/or video streams. However, there are several bottlenecks need to be addressed before mobile multimedia communication can be achieved. Additionally, multimedia communication experiences similar bottlenecks in other radio links. Before discussing the invention, it is useful to survey the prior art for a summary of contemporary approaches to solving these problems.

The first bottleneck concerns multimedia communication bandwidth requirements. New packet based cellular network standards as well as non-cellular standards are addressing this bottleneck. The packet based cellular network standards include GSM/GPRS, WCDMA, CDMA2000, and HDR. The non-cellular standards include Bluetooth, IEEE 802-11a/b and Hiperlan.

A second, significant bottleneck to mobile multimedia communication is energy consumption. As radios built for mobile multimedia communication are frequently powered primarily by battery, the energy consumed must be minimal. Energy consumption in such radio systems is predominantly composed of computation energy and communication energy. The computation energy refers to the energy consumed in processing information to be transmitted and/or received. The communication energy refers to the energy consumed in wirelessly transferring information. Both computation energy and communication energy requirements can be very high.

Note that fixed station radios may also experience energy consumption bottlenecks. These bottlenecks may also be due to battery limitations, but are more often due to energy limitations in amplifiers and computation energy consumption.

A third bottleneck to mobile multimedia communication is channel noise. As the number of mobile users increase in a neighborhood, the interference between users will also increase, causing more channel noise. While several methods exist for overcoming the effects of channel noise, more bandwidth and energy are required to implement these methods. Such methods include Automatic-repeat-ReQuest (ARQ) schemes and channel coding.

The conditions and requirements of wireless multimedia communication vary. This fact can be used to overcome the bandwidth and energy bottlenecks. Variations in channel conditions may be due to user mobility, changing terrain, and so on. For example, the Signal to Interference Ratio (SIR) for cellular phones varies by as much as 100 dB, as a function of cellular phone's distance from the base station.

The Quality of Service (QoS) and Quality of Multimedia Data (QoMD) required during multimedia communication changes depending on the current multimedia service. QoS is often measured in terms of latency and/or Bit Error Rate (BER). By way of example, video telephony and web browsing have different QoS (latency) and QoMD (quality) requirements.

Mobile multimedia communication is usually discussed in terms of several OSI communication layers.

- OSI layer one is often known as the physical layer and acts to physically transfer data through at least one physical medium.
- OSI layer two is the data link layer, which transfers data between the network layer (three) and the physical layer (one). The data link layer manages the physical communication between connecting systems. This layer includes two sublayers: a Media Access Control (MAC) sublayer and the Logical Link Control (LLC) sublayer. The MAC sublayer controls how a link in a network gains access to data and permission to transfer that data across the network. The LLC sublayer controls frame synchronization, flow control and error checking.
- OSI layer three is the network layer, which provides switching and routing capabilities, creating logical paths, often known as virtual circuits, for transferring data between nodes of a network. This layer provides routing, forwarding, as well as, addressing, internetworking, error handling, congestion control and packet sequencing functions.
- OSI layer four is the transport layer, which provides transparent transfer of data between end systems, ensuring complete data transfer.
- OSI layer five is the session layer, which establishes, manages, and terminates connections between applications at various ends of a network.
- OSI layer six is the presentation layer, which provides independence from different data representation, such as encryption, by translating between the application layer and the network layer.
- OSI layer seven is the application layer, which supports application and end user processes. Typical activities of this level include user authentication, file transfers, e-mail, and other network-based services, such as video conferencing and web browsing.

Wireless data communication devices typically transfer data without knowing the type of data being transferred. In many cases, isolating the various communication functions at each protocol layer is useful. New communications protocols and applications can be added without altering the lower layers of the protocol, such as radio and packet framing. However, this approach of isolating the functions of different layers has limited ability to optimize power consumption, bandwidth efficiency or other constrained resources. What is needed are methods and devices with improved ability to optimize constrained resources, including at least power consumption and bandwidth latency.

Several methods have been proposed for optimizing layers three and four. The optimization of a TCP/IP based wireless communication system has been variously proposed using two basic approaches. The first approach hides the non-congestion related losses from the TCP sender. The second approach makes the sender aware of losses not due to congestion, which can be summarized as wireless hop and losses.

These two TCP/IP based wireless optimization methods have been implemented using three main algorithms. The first algorithm uses a transport layer end-to-end approach. The second algorithm uses a splitting of the connection between the wireless channel and the network. The third algorithm uses a data link layer approach.

For the Transport Layer approach, the degraded performance of TCP over wireless links is mostly due to mistaking wireless losses for congestion. There are numerous proposals for modifying the TCP protocol.

During handoffs in cellular systems, packets may be delayed or even lost. R. Cáceres and L. Iftode, "Improving the performance of reliable transport protocols in mobile computing environments," *IEEE Journal on Selected Areas in Communications*, vol. 13, no. 5, June 1995 pp. 850-857 makes the proposal that recovery from these losses should be initiated right after handoff completion, without waiting for a timeout. TCP can achieve this by receiving appropriate signals from lower layers.

Alternatively, TCP can exploit mobility hints from lower layers to heuristically distinguish losses due to handoffs. For these losses, TCP can avoid having the slow start threshold during recovery, thus skipping the congestion avoidance phase.

K. Brown and S. Singh, "M-TCP: TCP for mobile cellular networks," *Computer Communications Review*, vol. 27, no. 5, October 1997, pp. 19-43 proposes that the wireless link endpoints choke TCP senders during handoffs, by transparently closing the receiver's advertised window. The sender then freezes all pending timers and starts periodically probing the receiver's window. However, there is a problem. By shrinking the advertised window, M-TCP violates TCP guidelines.

For the Split Connection solutions, after handoffs, congestion avoidance helps probe the capacity of the new link. With other wireless losses, retransmissions are sufficient for recovery.

However, end-to-end retransmissions are slow. A. Bakre and B. R. Badrinath, "Implementation and performance evaluation of Indirect-TCP," *IEEE Transactions on Computers*, vol. 46, no. 3, March 1997, pp. 260-278, proposed splitting TCP connections using as pivot points, routers connected to both wireless and wired links.

In the split connection scheme, end-to-end connections are decomposed into separate TCP sessions for the wired and wireless parts of the path. A separate protocol, optimized for error recovery, may be substituted over the wireless links.

There are some problems with the split connection approach. Split schemes violate end-to-end TCP semantics, since acknowledgments may reach the sender before data packets reach their destination. To preserve TCP semantics, acknowledgments must be delayed, thus reducing throughput. Pivot points face significant overhead, since packets undergo TCP processing twice, and considerable per connection state memory must be maintained there.

R. Ludwig and R. H. Katz, in "The Eifel algorithm: making TCP robust against spurious retransmissions," *Computer Communications Review*, vol. 30, no. 1, January 2000, pp. 30-36, proposed the Eifel scheme.

The Eifel scheme modifies TCP so as to avoid the spurious timeouts and fast retransmits due to handoffs or delayed data link layer retransmissions. Since these problems are due to TCP's inability to distinguish between acknowledgments for original packet transmissions and retransmissions, Eifel adds TCP timestamps to outgoing packets. Timestamps are echoed in acknowledgments, thus allowing spurious timeouts to be readily avoided, without changing TCP semantics.

However, end-to-end TCP recovery is not accelerated.

While TCP enhancement schemes would be attractive if only the endpoints needed modifications, in practice additional changes are needed. Some approaches require signaling from lower layers to detect handoffs. Other approaches require software to be installed and states to be maintained at pivot points.

In addition, split TCP schemes need alternative, TCP compatible, protocols to be deployed over wireless links for more efficient error recovery.

For the data link layer solutions, instead of modifying TCP, wireless losses are hidden from it. In cellular systems this is achieved by non-transparent mode Radio Link Protocols (RLPs). George Xylomenos, George C. Polyzos, "Link Layer Support for Quality of Service on Wireless Internet Links", Center for Wireless Communications & Computer Systems Laboratory, UCSD proposed such a data link layer solution, known as Acknowledged mode RLC for the Wideband Code Division Multiple Access protocol, (W-CDMA).

Another solution is to perform local error recovery, a data link layer task, at the IP level, as Snoop TCP, proposed by H. Balakrishnan, V. N. Padmanabhan, S. Seshan, and R. H. Katz, in "A comparison of mechanisms for improving TCP performance over wireless links," *Proceedings of the ACM SIGCOMM '96*, August 1996, pp. 256-269.

Snoop tracks TCP data and acknowledgments by maintaining state for each TCP connection traversing a pivot point. Snoop caches unacknowledged TCP packets and uses the loss indications conveyed by duplicate acknowledgments, plus local timers, to transparently retransmit lost data. It hides duplicate acknowledgments indicating wireless losses from the TCP sender, thereby preventing redundant TCP recovery. Snoop exploits the information present in TCP packets to avoid data link layer control overhead.

Balakrishnan, et. al. report that the Snoop approach outperforms split TCP schemes, without violating TCP semantics.

A. DeSimone, M. C. Chuah, and O. C. Yue, in "Throughput performance of transport-layer protocols over wireless LANs," *Proceedings of the IEEE GLOBECOM '93*, December 1993, pp. 542-549, report that the Snoop approach also avoids conflicting local and TCP retransmissions by suppressing duplicate TCP acknowledgments.

There are some problems and difficulties associated with the Snoop approach. Snoop requires the TCP receiver to be located right after the pivot point.

In the Snoop approach, if a wireless host is sending data to a remote receiver, TCP acknowledgments are returned too late for efficient recovery, and they may even signify congestion losses. In this situation, Explicit Loss Notification (ELN) is needed for TCP to distinguish between congestion and wireless losses. If the Snoop agent detects a non congestion related loss, it sets an ELN bit in TCP headers and propagates it to the receiver, which echoes it back to the sender.

Snoop can use queue length information to heuristically distinguish congestion from wireless errors. When receiving an ELN notification, the TCP sender retransmits the lost packet without invoking congestion control. Although ELN is applicable to most topologies, it requires changes to router algorithms.

Also in the Snoop approach, a lost packet can only be retransmitted after a round trip time has elapsed, when an acknowledgment with the ELN bit set is returned.

Cellular system Radio Link Protocols (RLPs) avoid the layering violations of Snoop, which examines TCP headers at the IP level. However, DeSimone et. al. Report that they may retransmit data in parallel with TCP.

R. Ludwig, B. Rathonyi, A. Konrad, K. Oden, and A. D. Joseph, in "Multi-layer tracing of TCP over a reliable wireless link," *Proceedings of the ACM SIGMETRICS '99*, June 1999, pp. 144-154, report that this occurs rarely with fully reliable RLPs. It is prevented by RLPs that abandon error recovery after some failed attempts.

Link layer schemes operate at the local level with low round trip delays that allow fast recovery, in contrast to TCP modifications. Their main limitation is that they offer a single level of recovery, which may not be appropriate for all higher layer protocols and applications.

Michele Zorzi, Michele Rossi, Gianluca Mazzini, in "Throughput and energy performance of TCP on a Wideband CDMA air interface", Dipartimento di Ingegneria, Universit' a di Ferrara, Italy, present a study on the performance of TCP, in terms of both throughput and energy consumption, in the presence of a Wideband CDMA radio interface.

In Zorzi, et. al., no RLP was considered as it was assumed that Transparent Mode was used. The results show that the relationship between TCP throughput and average error rate (block error probability) is largely independent of the network load, making it possible to introduce a universal throughput curve, empirically characterized, which gives throughput predictions for each value of the user error probability.

Another main conclusion of the Zorzi et. al. study is that an optimal value of power control threshold exists, potentially leading to significant energy savings in return for very small throughput degradation. The study also indicates that power savings at the higher level depend on lower layer tweaks.

TCP/IP support will allow all these wireless systems to interoperate by becoming parts of the Internet. The next step is to provide direct interoperability between wireless systems by allowing users to transparently move not only between cells within the same system, but also from one system to another, depending on the services and coverage available.

In these unified hierarchical cellular systems, large cells will be overlaid by multiple smaller cells in areas with increased user concentrations. Since handoffs momentarily disrupt connectivity with adverse effects on TCP performance, hierarchical cellular systems must be carefully designed to avoid increasing the severity of handoff induced problems.

The small area and high data rates of microcells will lead to more frequent handoffs and potentially increased losses during each handoff.

Handoffs between different systems may also dramatically change the performance of underlying wireless links.

To reduce the severity of these problems, one approach is to exploit co-operation between layers so as to enable protocols to adapt their behavior as needed. Intensive research is directed towards adaptive data link layers that provide information to higher layers in an orderly fashion.

The European Union WINE project is studying protocol adaptivity and link dependent configuration so as to optimize IP performance over wireless links, without exposing lower layer details to TCP.

A protocol enhancing proxy approach has been developed in the Wireless Adaptation Layer (WAL), to handle automatic adaptivity. The emerging software radios, which allow the configuration of physical and data link layer parameters in real time, will further enhance link adaptivity, hence protocol adaptivity will become even more important in the future.

There have been successful implementations optimizing specific layers for such as channel conditions or QoS, but these solutions only understand limited portions of the overall system. Still other optimization approaches have focused on computation energy only, and not a combination of commutation energy and communications energy.

What is needed is a solution that can understand the complex relationships of the acquisition, transmission, reception, and outputting of data to optimize on specific constrained resources or any combination of these constrained resources.

There are significant limitations in prior art devices using only a single protocol layer for an optimization method. One such limitation has been the encryption that is often done on the data before the data is made available to OSI Layer 4 and below. TCP packet sizes and window sizes (OSI Layer 4), IP packet sizes (OSI Layer 3), and Packet Data Units (OSI Layer 2) are not able to provide optimum transmission values because the data unit sizes are not adjusted for the transmission path. These layers are not able to probe the data stream since the encryption mechanism has hidden any attempt at understanding the data contents.

Mechanisms and methods are needed supporting encryption and packet parameterization that take into account the protocol layers from the physical layer one through transport layer four, such as TCP.

SUMMARY OF THE INVENTION

The invention addresses at least the problems discussed in the background. The present invention overcomes some of the significant limitations of current devices that use only a single protocol layer, optimization method.

The invention includes optimizing a radio link by the following steps: Acquiring at least OSI layer one and two performance measurements. Determining an optimum setting collection, for at least one layer between at least OSI layer three and a top layer. Configuring at least that one layer based upon the optimum setting collection. The top layer is at least OSI layer four.

A radio link includes at least one of the following: a wireless mobile device, a fixed station radio, a fixed radio data relay, a personal digital assistant with wireless communications capabilities, a wireless base station, an end station attached to a wireless network, an intermediate communications processor with wireless communication capability, and a boundary device optimizing encapsulation between two members of a communication protocol collection.

The present invention is an apparatus supporting the optimized transfer of data wirelessly using controlled amounts of radio link and network resources. The resources being optimized include, but are not limited to, battery drain, RF bandwidth, bit-rate bandwidth, and latency of the transmission.

The invention achieves this optimization by using the overall knowledge of what is being transferred to optimize the protocol layers in the communications process. To optimize the resources involved in the transfer, each protocol layer provides a set of metrics associated with its operation. The metrics are provided as input to a radio link optimizer mechanism and the radio link optimizer mechanism then provides a useful set of parameters back to at least one OSI protocol layer three or above, preferably to each OSI protocol layer.

Various embodiments of the invention do not require any modification to the existing TCP/IP standard, which is a significant advantage.

These and other advantages of the present invention will become apparent upon reading the following detailed descriptions and studying the various figures of the drawings.

DETAILED DESCRIPTION OF THE INVENTION

The invention includes optimizing a radio link by the following steps: Acquiring at least OSI layer one and two performance measurements. Determining an optimum setting collection, for at least one layer between at least OSI layer three and a top layer. Configuring at least that one layer based upon the optimum setting collection. The top layer is at least OSI layer four.

A radio link includes at least one of the following: a wireless mobile device, a fixed station radio, a fixed radio data relay, a personal digital assistant with wireless communications capabilities, a wireless base station, an end station attached to a wireless network, an intermediate communications processor with wireless communication capability, and a boundary device optimizing encapsulation between two members of a communication protocol collection.

The present invention is an apparatus supporting the optimized transfer of data wirelessly using controlled amounts of radio link and network resources. The resources being optimized include, but are not limited to, battery drain, RF bandwidth, bit-rate bandwidth, and latency of the transmission.

The invention achieves this optimization by using the overall knowledge of what is being transferred to preferably optimize each of the protocol layers in the communications process.

To optimize the resources involved in the transfer, each protocol layer provides a set of metrics associated with its operation. The metrics are provided as input to a radio link optimizer mechanism and the radio link optimizer mechanism then provides a useful set of parameters back to at least one OSI protocol layer three or above, preferably to each OSI protocol layer.

Figure 1:
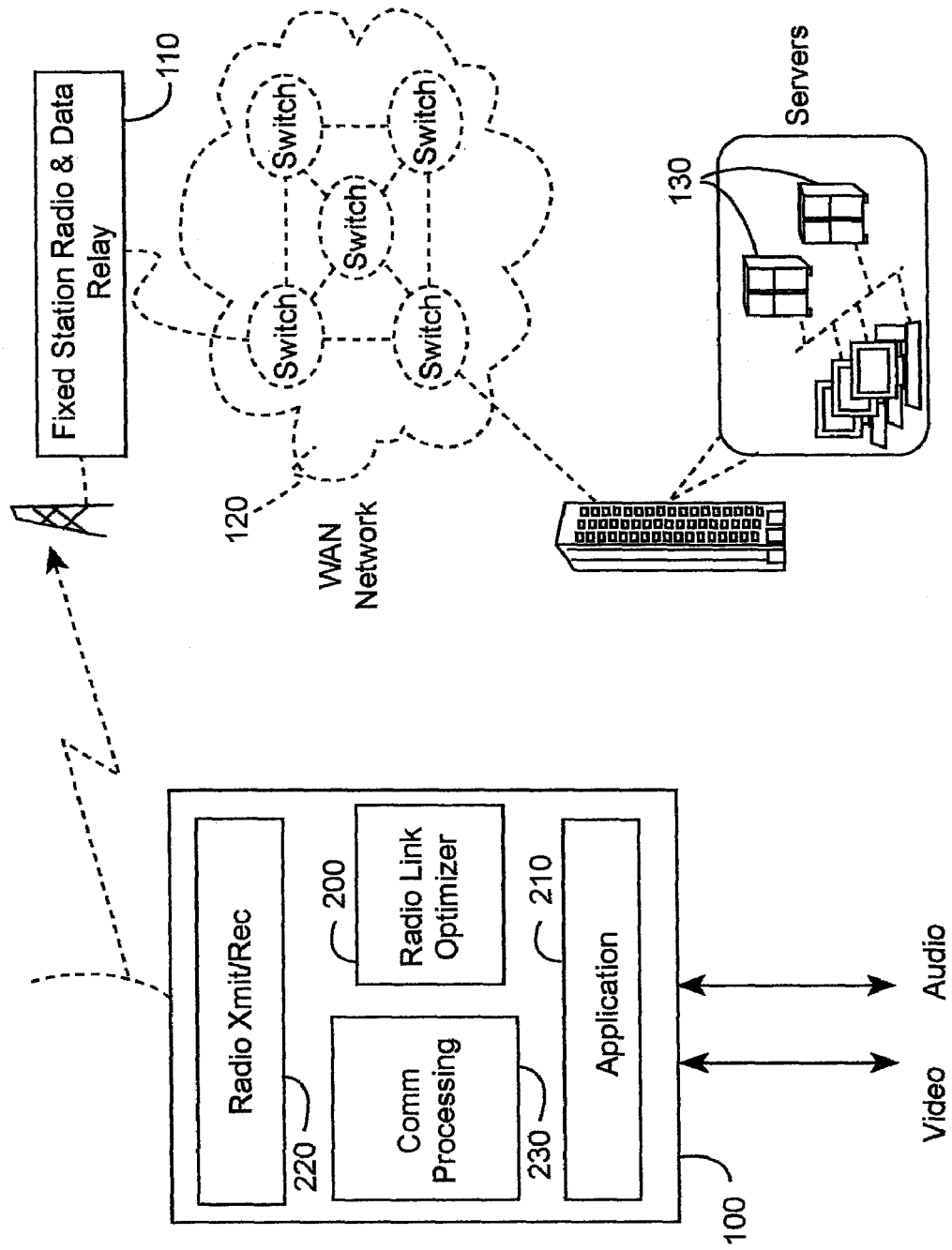
FIG. 1 illustrates an overall view of a system incorporating an embodiment of the invention 200 as implemented in a Wireless Mobile device 100 wirelessly communicating via fixed station radio and data relay 110 with at least one server 130 through a Wide Area Network 120.

FIG. 1 illustrates an overall view of a system incorporating an embodiment of the invention 200 as implemented in a Wireless Mobile device 100 wirelessly communicating via fixed station radio and data relay 110 with at least one server 130 through a Wide Area Network 120.

In this exemplary system, mobile device 100 performs at least one useful function such as video teleconferencing anywhere in a geographic area supported by the wireless network including 110-120-130.

Wireless Mobile device 100 is able to communicate with one or more fixed station radio and data relay sites 110. Data Traffic from these fixed stations may communicate with each other or may be forwarded into the Wide Area Network 120. The Wide Area Network 120 is preferably able to deliver a multi-media data stream involving at least one destination data communications or telecommunications end system 130.

Within Wireless Mobile Device 100 are several conventional functions needed to implement a multimedia communications service. In terms of the standard Open System Interconnect (OSI) terminology, Application function 210 preferably implements OSI Layers 5-7, which controls acquisition and conversion of video and audio information. Communication processing function 230 implements OSI Layers 2-4 including session control, address, and capability exchange functions, assuring reliable end-to-end transport of multimedia data.

Radio function 220 is able to transmit and/or receive data wirelessly. This physical layer transport implements OSI Layer 1, which is capable of implementing at least one of many Wide Area, Metropolitan Area, Local Area or Personal Area wireless protocols. Although shown communicating with a fixed station 110 in FIG. 1, alternate embodiments include another mobile device, a group of mobile devices or a mixture of mobile and fixed stations.

In a preferred embodiment of the present invention, the radio link optimizer 200, present within the Wireless Mobile device 100, integrates the application requirements, current wireless system conditions and other relevant input information. The wireless system conditions include, but are not limited to, a knowledge of the physical layer network, the end system 130 capabilities, and the current physical conditions as sensed by Radio function 220. As a result of this multiple layer input, radio link optimizer 200 then performs one or more methods to optimize the overall communications.

Optimizing can be done for minimizing battery power requirements, lowest end-to-end system delay, maximum visual clarity, maximum audio quality, minimum RF bandwidth, minimum data bandwidth, lowest error rate or other desired results.

In a preferred embodiment, radio link optimizer 200 implements a combination of these goals allowing an intelligent and adaptively changing optimization method. Radio link optimizer 200 implements the desired goal by altering the parameters that feed into each one of the wireless mobile device 100 functions, 200-230.

In addition to controlling local Wireless Mobile device 100 functions, another preferred embodiment of the present invention is able to communicate with similar intelligent optimizing functions contained within other OSI media and transport layers of each communications link handling the end-to-end communications. Using the overall intelligence and monitor capabilities, similar radio link optimizer functions can provide an optimized end-to-end optimizing strategy.

The radio link optimizer invention is applicable to other areas of the data transport network.

Figure 2:
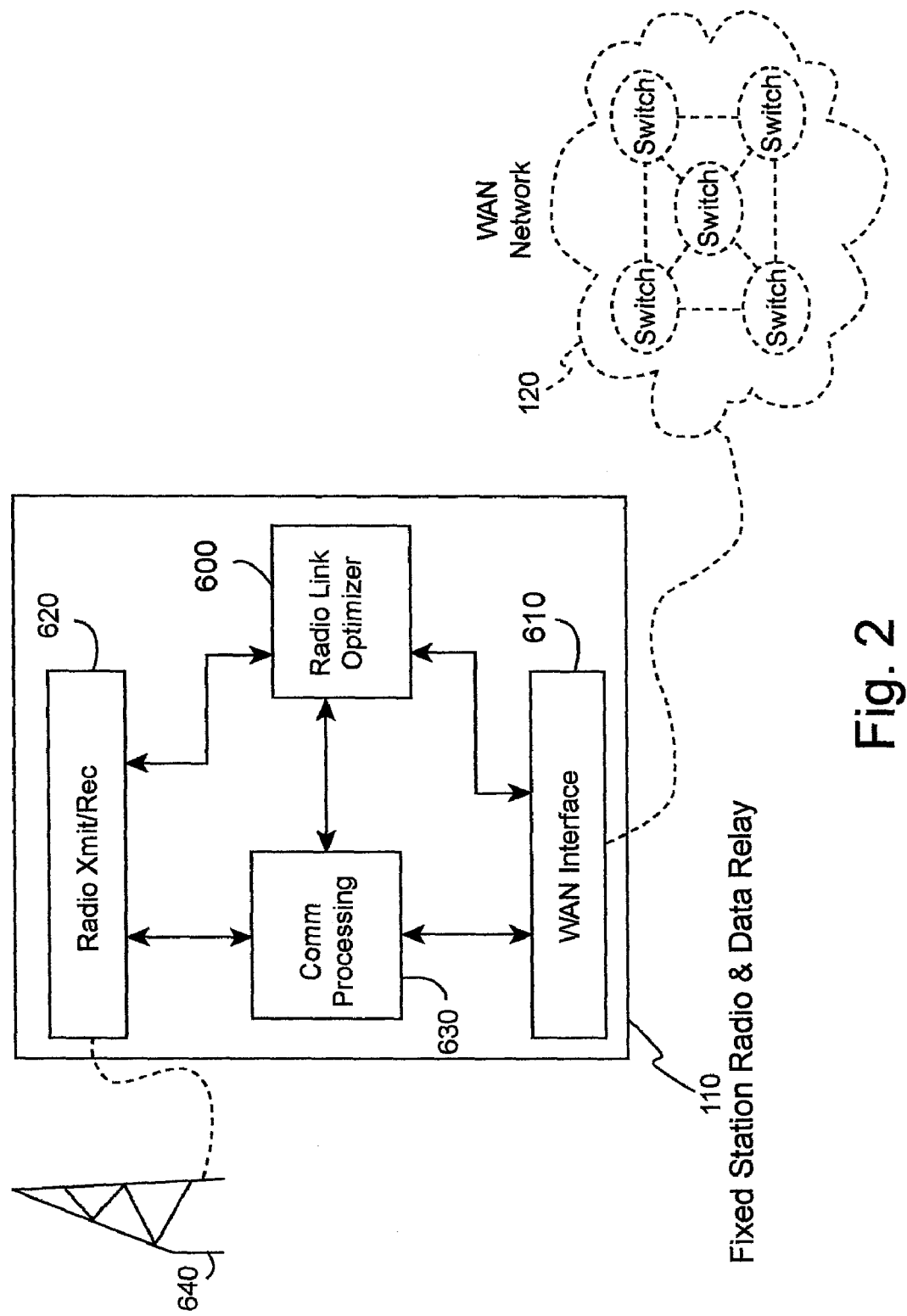
FIG. 2 illustrates an embodiment of the present invention 600 in the Fixed Station Radio and data relay facility 110.

FIG. 2 illustrates an embodiment of the present invention 600 in a fixed station radio and data relay facility 110.

Fixed station radio 110 is in contact with a wireless mobile device, which may contain an radio link optimizer 200 or may not contain an radio link optimizer. Antenna 640 is connected to the radio receiver/transmitter 620, and the communications processing 630 provides the proper messaging allowing the proper operation of the fixed station radio 110 and the proper messaging to accept and relay data between the Wide Area Network 120 and the wireless mobile device.

Radio link optimizer 600 is able to monitor the many different protocols operating in environment illustrated in FIG. 2. Radio link optimizer 600 embodies a method of optimizing at least OSI layers one to four. Radio link optimizer 600 preferably performs a similar high level optimization found in radio link optimizer 200 but may vary in the specific input, output and methods that are implemented.

In a preferred embodiment, radio link optimizer 600 is aware of the presence of radio link optimizer 200, and is able to exchange messages with radio link optimizer 200 to provide additional information about the status and capabilities of the network. In an alternate embodiment, the optimization performed by radio link optimizer 600 includes status, capabilities, and parameters of radio link optimizer 200.

Radio link optimizer 600 is also preferably able to handle many different Wireless Mobile devices simultaneously. In such embodiments, radio link optimizer 600 must be able to process a mixture of Wireless Mobile devices with and without internal radio link optimizers.

Those skilled in the art will appreciate that this novel invention can be extended to many other parts of a telecommunications and data communications network. The apparatus and method can be incorporated into end stations, servers, intermediate node communications processors, within public networks, and other communications systems.

Figure 3:
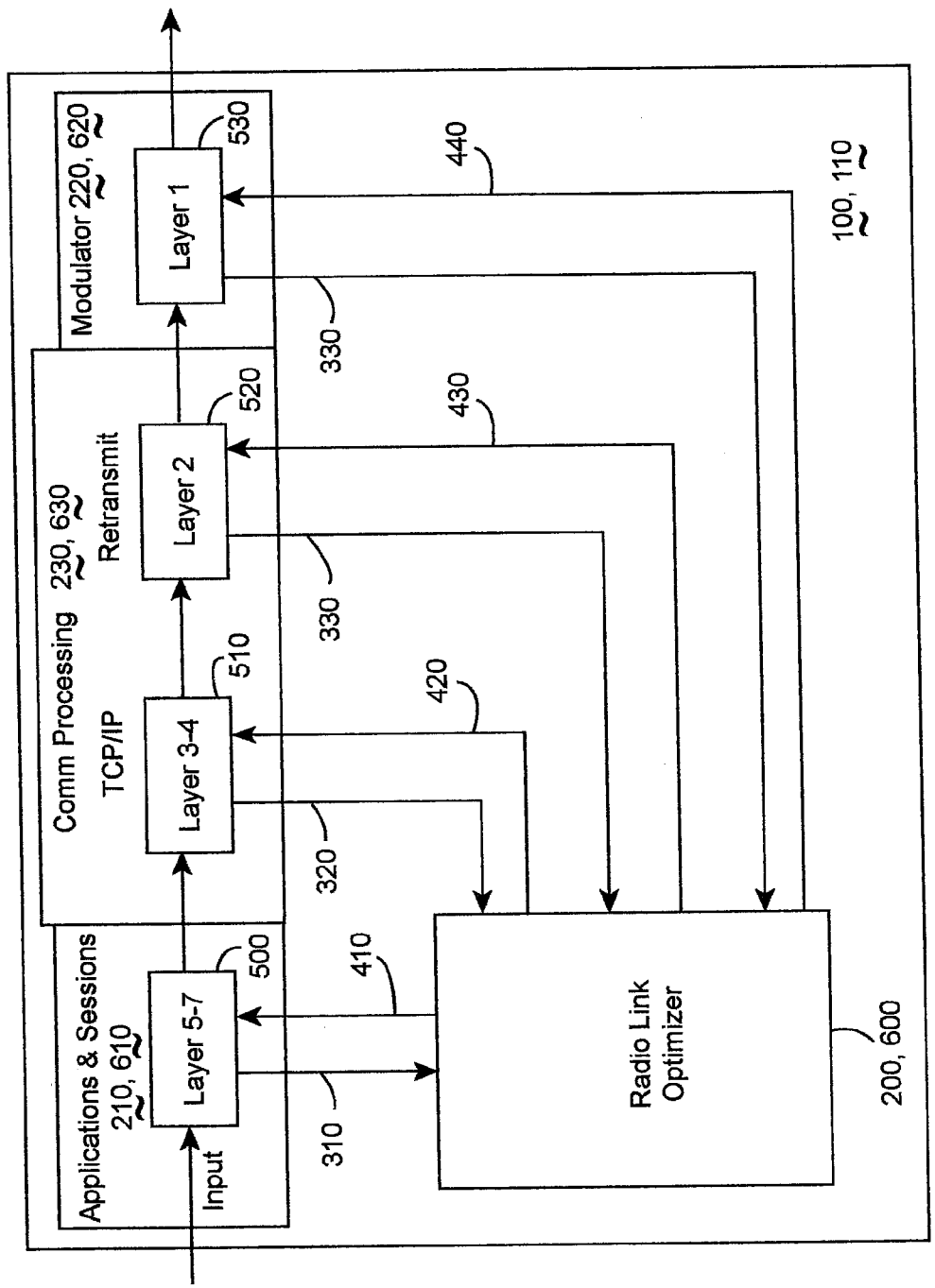
FIG. 3 illustrates additional details of preferred embodiments incorporating radio link optimizer 200 in wireless mobile device 100 of FIG. 1, and radio link optimizer 600 in fixed station radio and data relay 110 of FIG. 2, involved in data transmission.

FIG. 3 illustrates additional details of preferred embodiments incorporating radio link optimizer 200 in wireless mobile device 100 of FIG. 1, and radio link optimizer 600 in fixed station radio and data relay 110 of FIG. 2, involved in data transmission.

In FIG. 3, external input provides video and/or audio streams to be transmitted. The capabilities of the input data acquisition, session, system resources and the cost of these resources are parameters made available as input to radio link optimizer 200, 600 respectively of FIGS. 1 and 2, via communications mechanism 310. The nature and mechanism of the input to radio link optimizer 200, 600 may be of many forms including, but not limited to, memory variables, operating system messaging, serial communications links, or parallel bus communications.

In FIGS. 1-3, neither Wireless Mobile device 100 nor fixed antenna station and data relay 110 requires the presence of another radio link optimizer in any other part of the communications path.

If other radio link optimizers are present near radio link optimizer 200, it is preferably capable of optimizing the communications path with other radio link optimizers. If other radio link optimizers are not present, as in FIG. 5, radio link optimizer 200 will be essentially transparent to existing communications processing elements anywhere in the network. Radio link optimizer 200 will perform the optimization method based on the information that is available.

If other radio link optimizers are present near radio link optimizer 600, it is preferably capable of optimizing the communications path with other radio link optimizers. If other radio link optimizers are not present, radio link optimizer 600 will be essentially transparent to existing communications processing elements anywhere in the network. Radio link optimizer 600 will perform the optimization method based on the information that is available.

Figure 4:
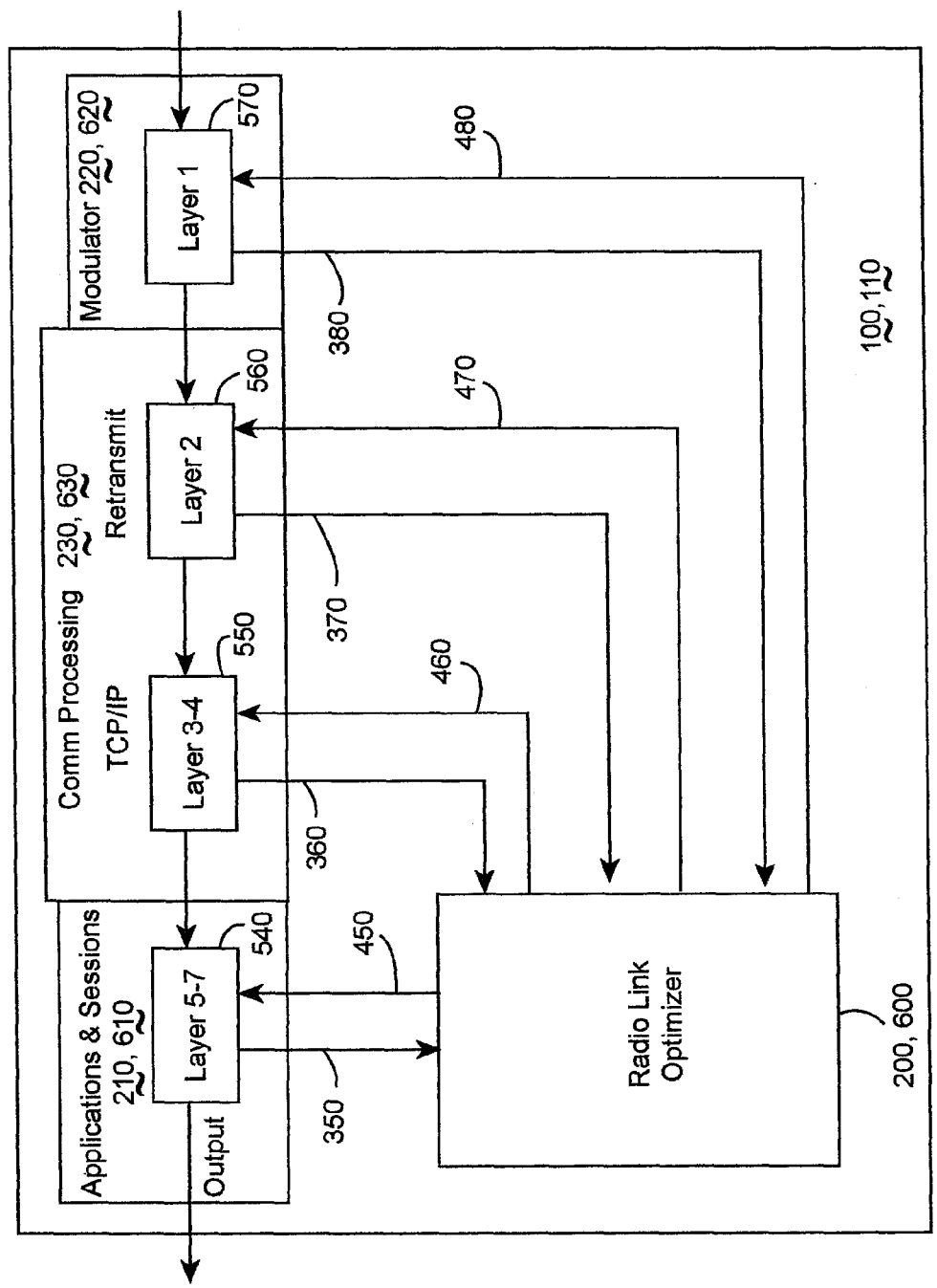
FIG. 4 illustrates additional details of preferred embodiments incorporating radio link optimizer 200 in wireless mobile device 100 of FIG. 1, and radio link optimizer 600 in fixed station radio and data relay 110 of FIG. 2, involved in data reception.

FIG. 4 illustrates additional details of preferred embodiments incorporating radio link optimizer 200 in wireless mobile device 100 of FIG. 1, and radio link optimizer 600 in fixed station radio and data relay 110 of FIG. 2, involved in data reception.

Processing blocks 570, 560, 550, and 540 implement receive function and processing steps. Using the receiver and transmitter capabilities, illustrated in FIGS. 3 and 4, support wireless mobile device 100 implements bi-directional data communication. Similarly, the receiver and transmitter capabilities, illustrated in FIGS. 3 and 4, support fixed station radio 110 implementing bi-directional data communication. In both of these preferred embodiments, wireless communication is full duplex, with the radio link optimizer 200 also able to support half-duplex or simplex sessions as required.

In a manner analogous to the transmit function illustrated in FIG. 3, the processing blocks 570, 560, 550, and 540 of FIG. 4 provide input capabilities, status, and parameters to radio link optimizer 200, 600, respectively of FIGS. 1 and 2. Radio link optimizer 200, respectively 600, then provides parameters back to these processing blocks via communications mechanisms 480, 470, 460 and 450.

Radio link optimizer 200, respectively 600, is able to optimize both receive and transmit output parameters using the capabilities, status, and input parameters of both receive and transmit functions in the preferred embodiment.

In alternate embodiments, the receiver and transmitter radio link optimizers operate independently or with limited cross-functional capabilities.

Figure 5:
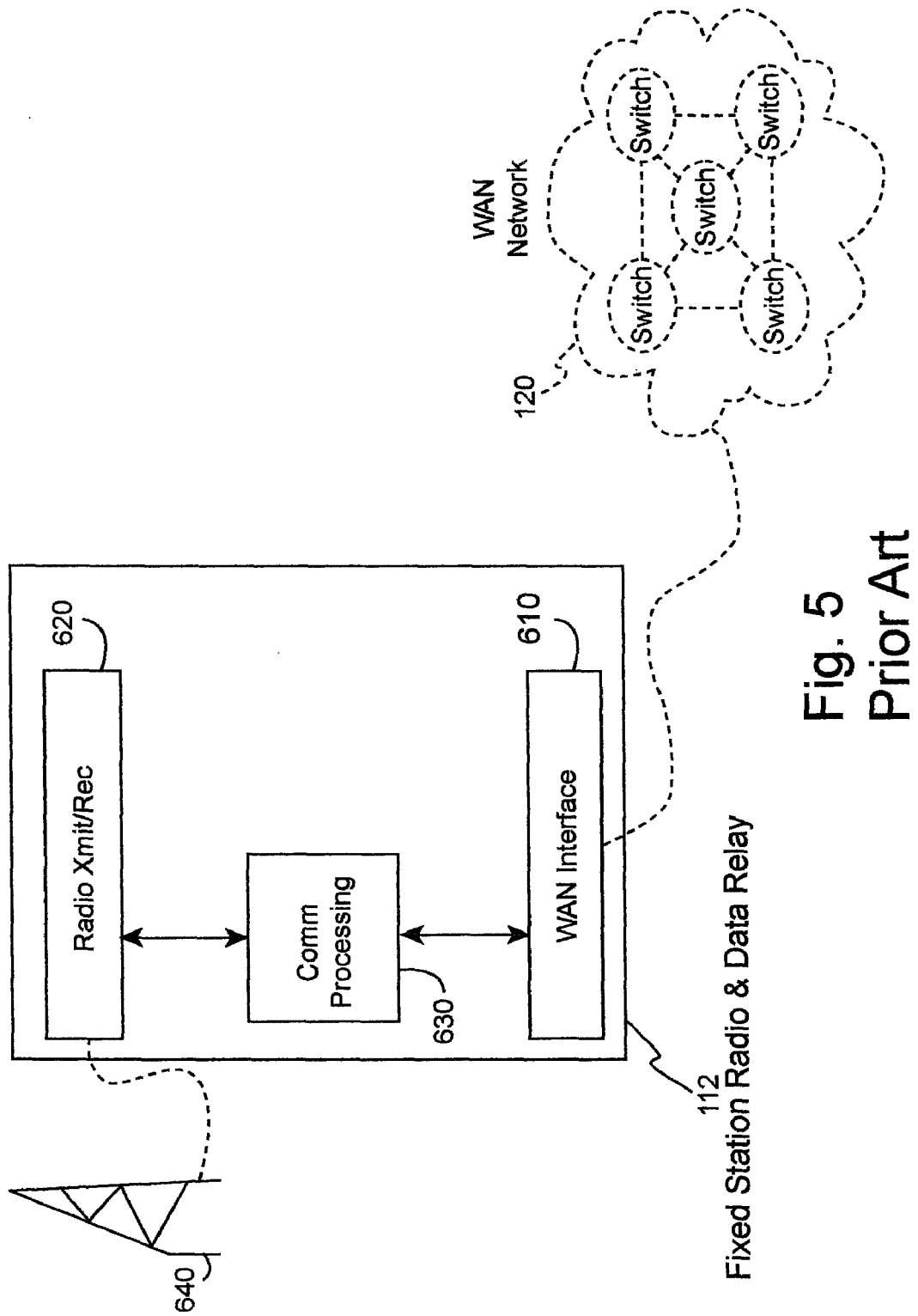
FIG. 5 illustrates a Fixed Station Radio and data relay facility 110 of the prior art, which does not include an embodiment of the invention.

FIG. 5 illustrates a Fixed Station Radio and data relay facility 110 of the prior art, which does not include an embodiment of the invention.

Embodiments of the invention provide mechanisms and methods needed for supporting encryption and packet parameterization, that take into account the protocol layers from the physical layer one through transport layer four, such as TCP.

The overall throughput of a TCP/IP based wireless packet data link is determined by, among other things, the length of the packet. One method of this invention at least controls the size of packets. The system relies on the radio link optimizer apparatus that receives a metric associated with the quality of the radio link and adjusts the packet size to optimally fit the channel conditions.

Figure 6:
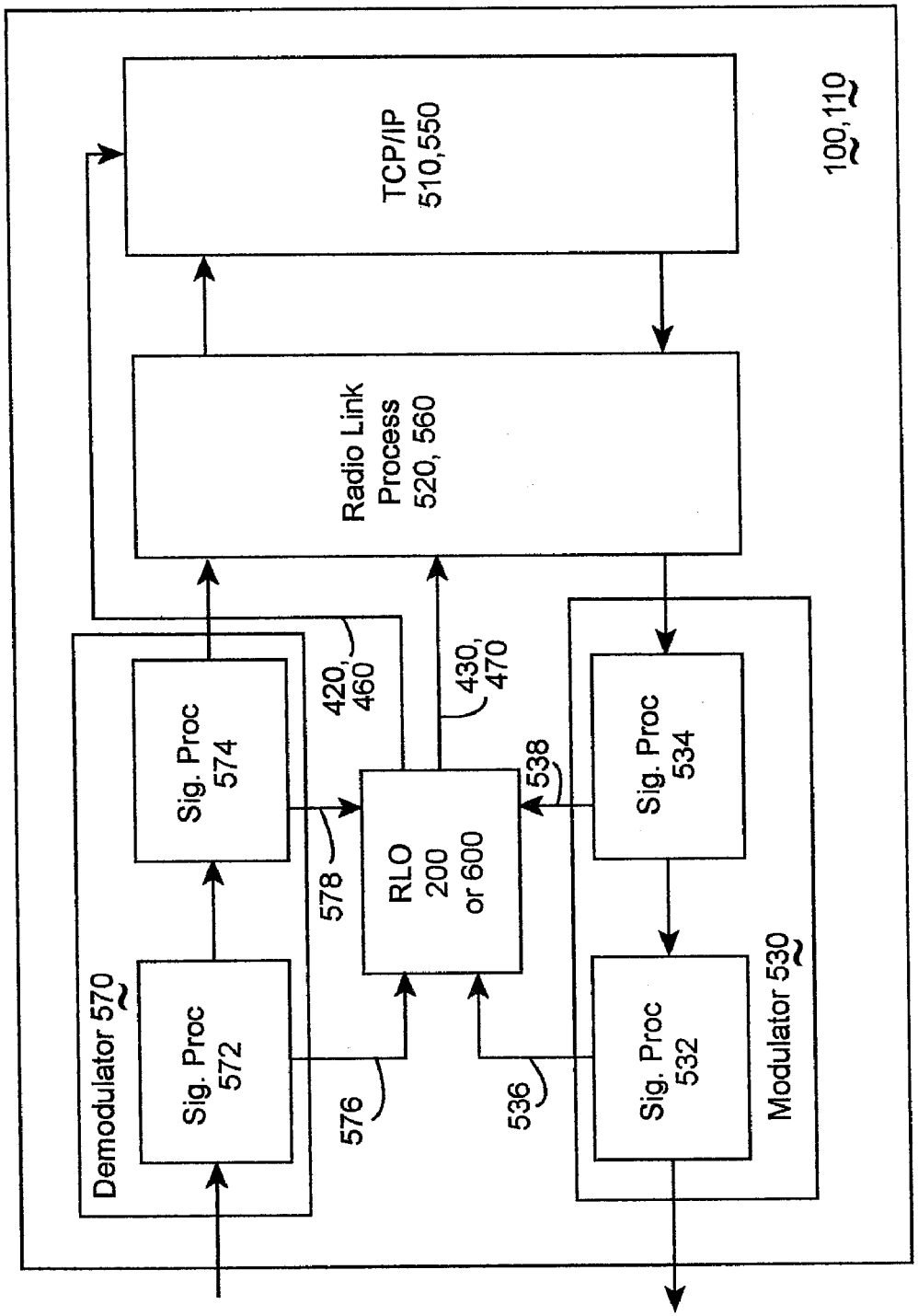
FIG. 6 illustrates a preferred embodiment of the invention 200 or 600 as implemented in a wireless mobile device 100 of FIG. 1 or fixed antenna station and data relay 110 of FIG. 2.

FIG. 6 illustrates a preferred embodiment of the invention 200 or 600 as implemented in a wireless mobile device 100 of FIGS. 1, 3 and 4 or fixed antenna station and data relay 110 of FIG. 2-4.

Signal processors 572 and 574 indicate signal processing algorithms in the receive chain of the physical layer, demodulator 570 of FIG. 4. Signal processors 532 and 534 indicate signal processing algorithms in the transmit chain of the physical layer, modulator 530 of FIG. 3.

Note that in fixed antenna stations 110, as illustrated in FIG. 2, there are typically multiple instances of demodulators 570 and/or modulators 530.

It should be further noted that different implementations provide these signal processing activities in a variety of hardware implementations including at least one of, but not limited to, Field Programmable Gate Arrays (FPGAs), Digital Signal Processors (DSPs), computers, and custom logic networks.

Radio Link Process 520, 560, respectively of FIGS. 3 and 4, controls the Layer 2 protocol of the system. In the case of Wideband Code Division Multiple Access (WCDMA), this includes management of Radio Link Control (RLC) and Medium Access Control (MAC).

This Layer 2 protocol may be able to ask for retransmissions etc. to make the overall link reliable as seen by the TCP/IP process 510, 550, respectively of FIGS. 3 and 4.

In the following, the same principles that are discussed for the TCP/IP algorithm can be applied to Layer 2. This may require modifications to Layer 2. Radio Link Optimizer 520, 560 performs the method used to adaptively and pro-actively adjust various TCP/IP parameters.

Under normal operating conditions, Wireless Mobile device 100 and/or fixed station radio 110 will transmit and receive data using a communication protocol compatible with TCP/IP. One purpose of certain preferred embodiments of this invention is to make this data exchange as efficient as possible. Increasing efficiency refers to reducing the number of times that packets need to be retransmitted by either the Wireless Mobile device 100 and/or the fixed station radio 110.

In FIG. 6, specific examples of signal processing blocks in the transmitter and receiver that will be referenced later, are a circuit to measure the transmitted signal power and the Turbo decoder in the receiver.

Consider first the case where Wireless Mobile device 100 or fixed station radio 110, of FIG. 6, is acting as a receiver of TCP/IP packets. Each TCP/IP packet carries a header that reduces the communication efficiency of the link. The smaller packets are, the greater the ratio of packet headers to overall data and the less efficiently the link is used. Thus, the optimum scenario will see TCP/IP packets that are as large as possible. However, if the link quality is low, the chance of receiving a large packet error-free is reduced.

To improve performance, the receiver may employ signal processing algorithms, such as Turbo decoding. However, these algorithms can only increase the Bit Error Rate (BER) performance of the link by a certain amount. Thus, if link quality deteriorates, a point will be reached where many packets are lost and the signal processing algorithms (e.g. Turbo decoding, channel equalization etc.) cannot recover the transmitted signal. When this point is reached, the link will suffer from an increase in packet retransmissions.

The invention includes a more optimal solution, which will pro-actively reduce the packet size as the link quality deteriorates. This can be accomplished by the radio link optimizer 200 and/or 600 performing the following steps. Reading 536, 538, 576, and 578 link quality parameters respectively from signal processing elements 532, 534, 572, and 574, in the physical layer. And respectively instructing 420, 460 the TCP/IP stack 510, 550 to reduce its advertised window size. This will force the transmitter to reduce the packet size it transmits to Wireless Mobile device 100 and/or fixed station radio 110.

This system does not require any modification to the existing TCP/IP standard, which is a significant advantage.

A more detailed example of how this preferred method can operate is described next. Turbo decoders increase the number of decoding iterations as the link quality degrades. For a good link, only 2-3 iterations may be required whereas a bad link may require 6-8 iterations. If the radio link optimizer 200, 600 sees that the number of iterations is increasing and is approaching the maximum number of permitted iterations, it instructs 420, 460 the TCP/IP stack 510, 550 to reduce the advertised window size. This results in a reduction in packet size and consequently, less data will need to be retransmitted when a block error occurs.

When Wireless Mobile device 100 and/or fixed station radio 110 of FIG. 6, is acting as a transmitter, the radio link optimizer 200 or 600, can preferably monitor the current transmit power level. When the network instructs Wireless Mobile device 100 to increase its transmit power level, and the actual transmitted power level gets close to the maximum transmit power level. The radio link optimizer should reconfigure the Wireless Mobile device 100 to reduce the size of packets transmitted as the system is reaching the point at which the BER on the channel cannot be decreased by increasing the transmitted power.

Figure 7:
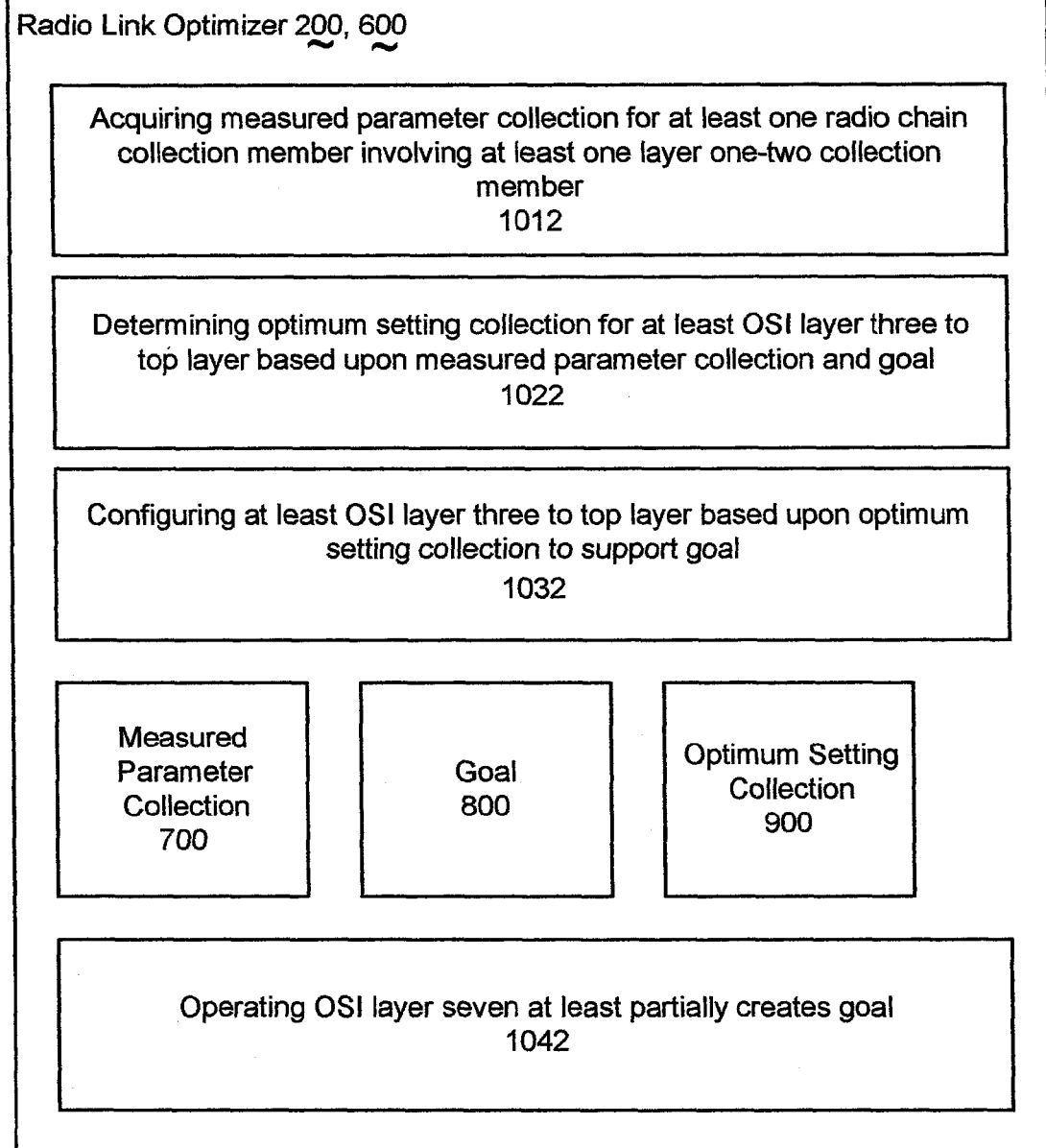
FIG. 7 illustrates an apparatus implementing Radio link optimizer 200 of FIG. 1 and/or 600 of FIG. 2, supporting a method optimizing a radio link 100 or 110 from OSI layer one to a top layer.

FIG. 7 illustrates an apparatus implementing Radio link optimizer 200 of FIG. 1 and/or 600 of FIG. 2, supporting a method optimizing a radio link 100 or 110 from at least OSI layer three to a top layer.

Figure 8A:
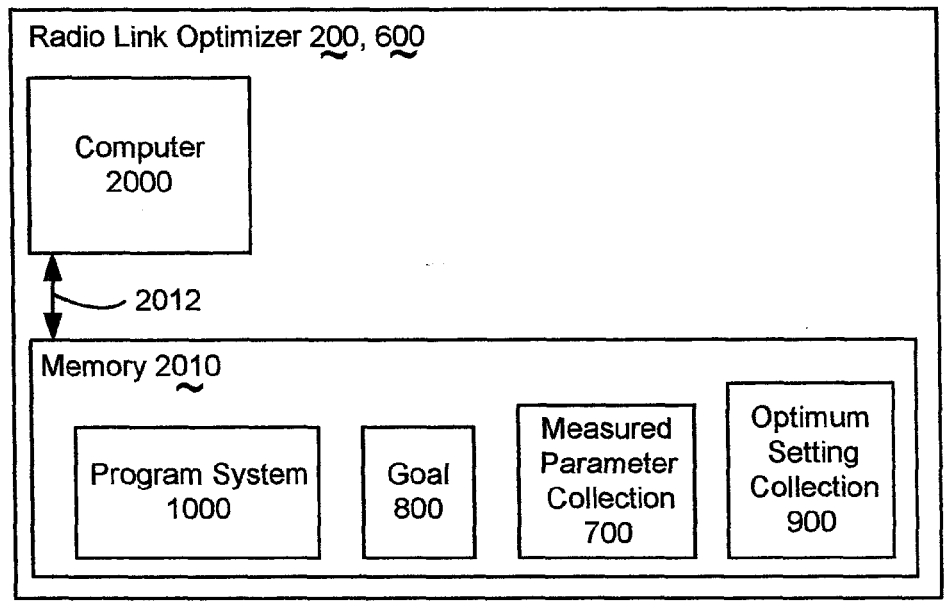
FIG. 8A illustrates an apparatus implementing the radio link optimizer 200 of FIG. 1 and/or 600 of FIG. 2, supporting the method optimizing a radio link 100 or 110 from OSI layer one to the top layer using computer 2000 controlled by program system 1000 containing program steps residing in accessibly coupled 2012 memory 2010.

FIG. 8A illustrates an apparatus implementing the radio link optimizer 200 of FIG. 1 and/or 600 of FIG. 2, supporting the method optimizing a radio link 100 or 110 from OSI layer one to the top layer using computer 2000 controlled by program system 1000 containing program steps residing in accessibly coupled 2012 memory 2010.

Figure 8B:
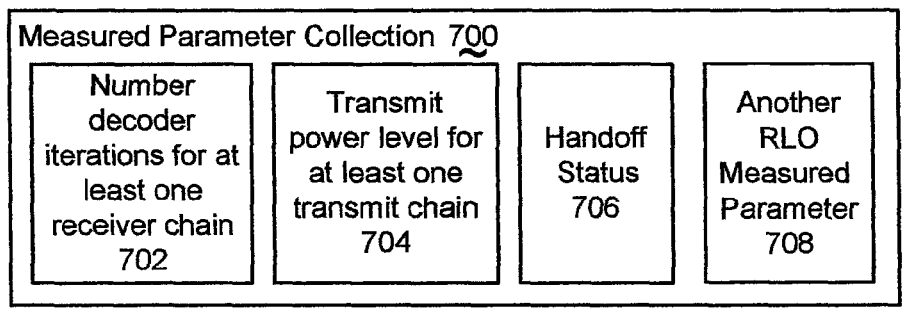
FIG. 8B illustrates one preferred embodiment of the measured parameter collection 700 of FIGS. 7 and 8A.

FIG. 8B illustrates one preferred embodiment of the measured parameter collection 700 of FIGS. 7 and 8A.

In FIG. 8B, the measured parameter collection includes number of decoder iterations 702 for at least one of said receiver chains, transmit power level 704 for at least one of said transmit chains, handoff status 706, and an another RLO measured parameter 708.

Figure 8C:
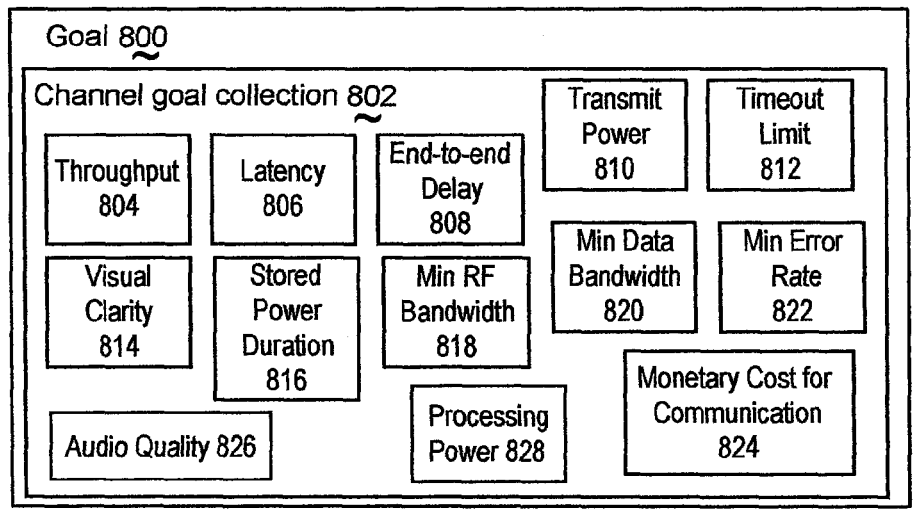
FIG. 8C illustrates one preferred embodiment of the goal of FIGS. 7 and 8A, including at least one member of the channel goal collection 802.
Figure 9A:
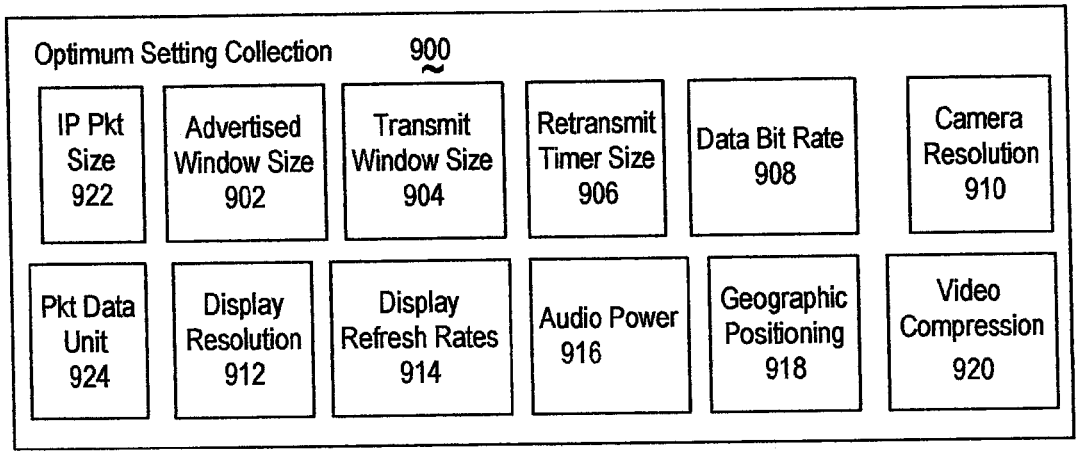
FIG. 9A illustrates one preferred embodiment of the optimum setting collection 900 of FIGS. 7 and 8A.

Another RLO measured parameter is communicated from another Radio Link Optimizer, and includes at least one of that radio link's measured parameters, goals, and optimum settings as illustrated in FIGS. 8B, 8C, and 9A, respectively.

FIG. 8C illustrates one preferred embodiment of the goal 800 of FIGS. 7 and 8A, including at least one member of the channel goal collection 802.

In FIG. 8C, the channel goal collection 802 preferably includes throughput goal 804, latency goal 806, end-to-end system delay goal 808, transmit power limit 810, timeout limit 812, visual clarity goal 814, stored power duration 816, minimized RF bandwidth goal 818, minimized data bandwidth goal 820, minimized error rate goal 822, monetary cost for communication goal 824, audio quality goal 826, and processing power goal 828.

Note that the monetary cost for communication goal 824 may include, but is not limited to, a monetary cost for peak bandwidth communication goal.

FIG. 9A illustrates one preferred embodiment of the optimum setting collection 900 of FIGS. 7 and 8A.

In FIG. 9A, the optimum setting collection includes advertised window size 902, transmit window size 904, retransmission timer size 906, data bit rate 908, camera resolution 910, display resolution 912, display refresh rate 914, audio power 916, geographic positioning 918, video compression 920, IP packet size 922, and packet data unit 924.

In the following figures will be found flowcharts of at least one method of the invention possessing arrows with reference numbers. These arrows will signify flow of control, and sometimes data, supporting implementations, including at least one program step or program thread executing upon a computer, inferential links in an inferential engine, state transitions in a finite state machine, and dominant learned responses within a neural network.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network.

A computer as used herein will include, but is not limited to an instruction processor. The instruction processor includes at least one instruction processing element and at least one data processing element, each data processing element controlled by at least one instruction processing element.

Figure 9B:
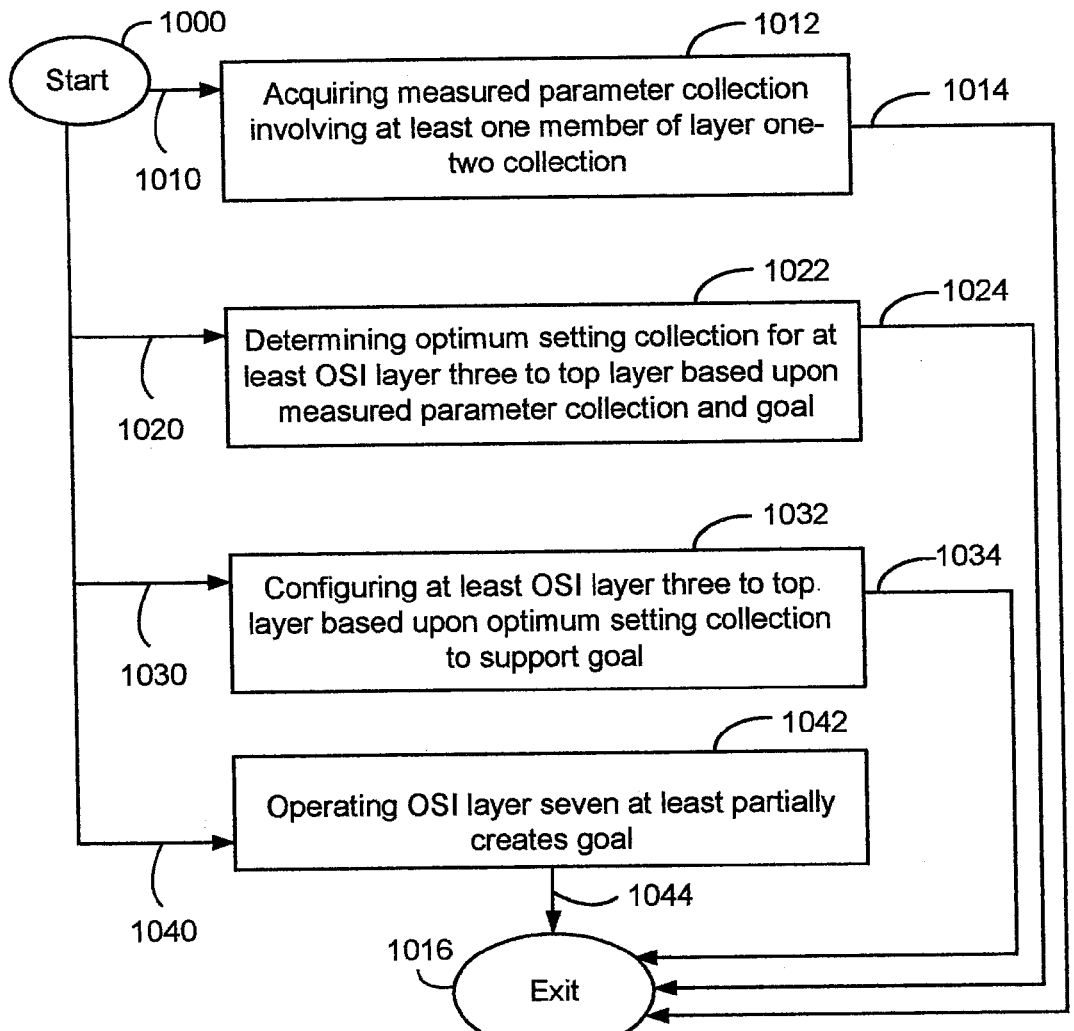
FIG. 9B illustrates a detail flowchart of program system 1000 of FIG. 8A of the method optimizing the radio link supporting wireless communication involving OSI link layers from an OSI layer one to a top layer.

FIG. 9B illustrates a detail flowchart of program system 1000 of FIG. 8A of the method optimizing the radio link supporting wireless communication involving OSI link layers from an OSI layer one to a top layer.

In FIGS. 7 and 9B, respectively means, operation 1012 perform acquiring a measured parameter collection. The measured parameter collection includes at least one measured parameter for at least one member of a radio chain collection involving at least one member of a layer one-two collection including at least the OSI layer one and an OSI layer two.

In FIGS. 7 and 9B, respectively means, operation 1022 performs determining an optimum setting collection for an OSI layer three to the top layer based upon the measured parameter collection and based upon a goal.

In FIGS. 7 and 9B, respectively means, operation 1032 performs configuring the OSI layer three to the top layer based upon the optimum setting collection to support the goal.

In certain preferred embodiments the top layer is at least an OSI layer five and at most an OSI layer seven. In certain further preferred embodiments, the top layer is essentially the OSI layer seven.

When the top layer is the OSI layer seven, FIGS. 7 and 9B further include respectively means, operation 1042, which performs operating the OSI layer seven to, at least partially, create the goal.

Figure 10:
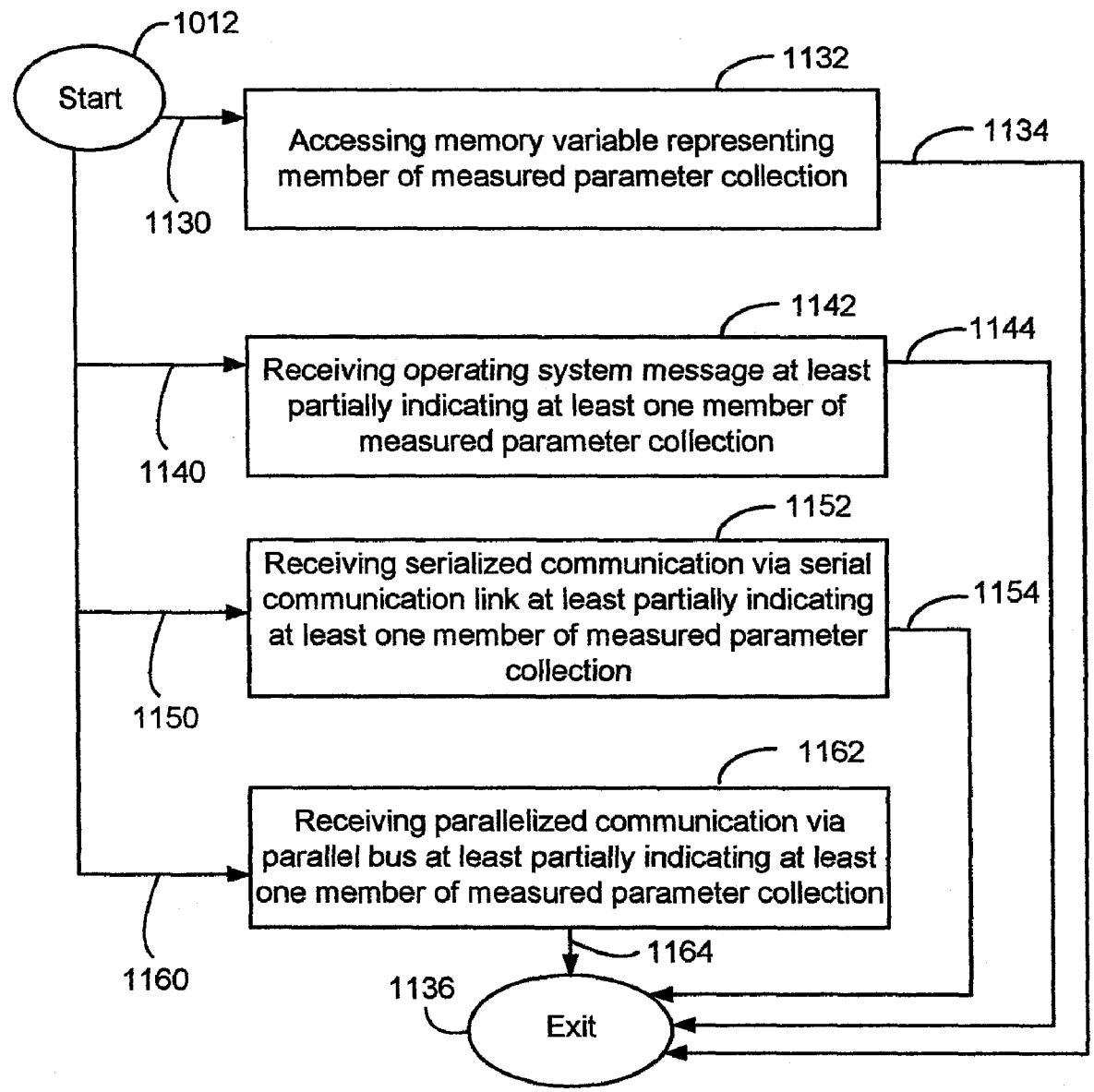
FIG. 10 illustrates a detail flowchart of operation 2012 of FIGS. 7 and 9A further acquiring the measured parameter collection.

FIG. 10 illustrates a detail of means, operation 2012 of FIGS. 7 and 9A further acquiring the measured parameter collection.

Means, operation 1132 performs accessing a memory variable representing a member of the measured parameter collection.

Means, operation 1142 performs receiving an operating system message at least partially indicating at least one member of the measured parameter collection.

Means, operation 1152 performs receiving a serialized communication via a serial communication link indicating at least one member of the measured parameter collection.

Means, operation 1152 performs receiving a parallelized communication via a parallel bus at least partially indicating at least one member of the measured parameter collection.

Figure 11:
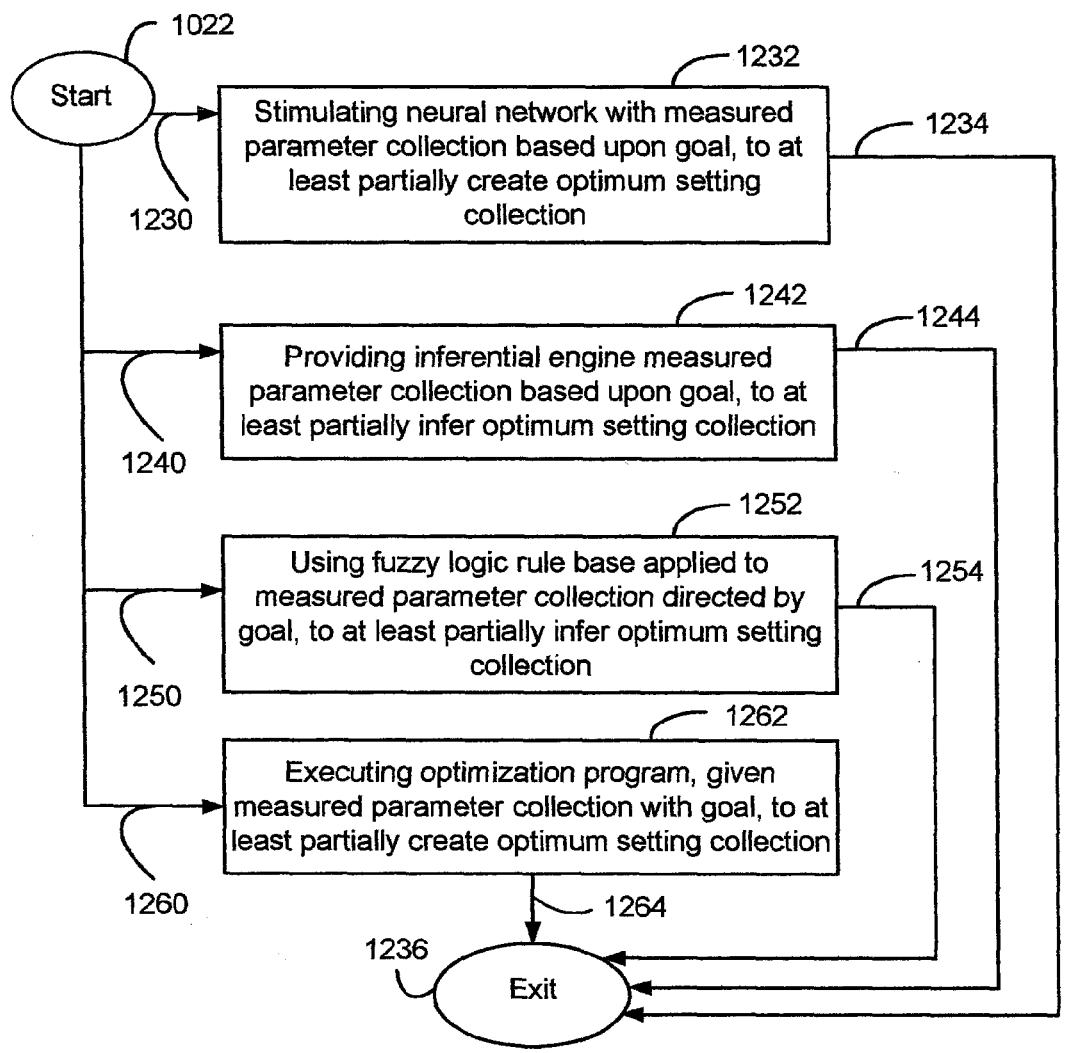
FIG. 11 illustrates a detail flowchart of operation 2022 of FIGS. 7 and 9A further determining the optimum setting collection by at least one member of a setting optimizer collection.

FIG. 11 illustrates a detail of means, operation 2022 of FIGS. 7 and 9A further determining the optimum setting collection by at least one member of a setting optimizer collection.

The setting optimizer collection includes operations 1232, 1242, 1252 and 1262 of FIG. 11.

Means, operation 1232 performs stimulating a neural network with the measured parameter collection based upon the goal, to at least partially create the optimum setting collection.

Means, operation 1242 performs providing an inferential engine the measured parameter collection based upon the goal, to at least partially infer the optimum setting collection.

Means, operation 1252 performs using a fuzzy logic rule base applied to the measured parameter collection directed by the goal, to at least partially infer the optimum setting collection.

Means, operation 1262 performs executing an optimization program, given the measured parameter collection with the goal, to at least partially create the optimum setting collection.

Figure 12:
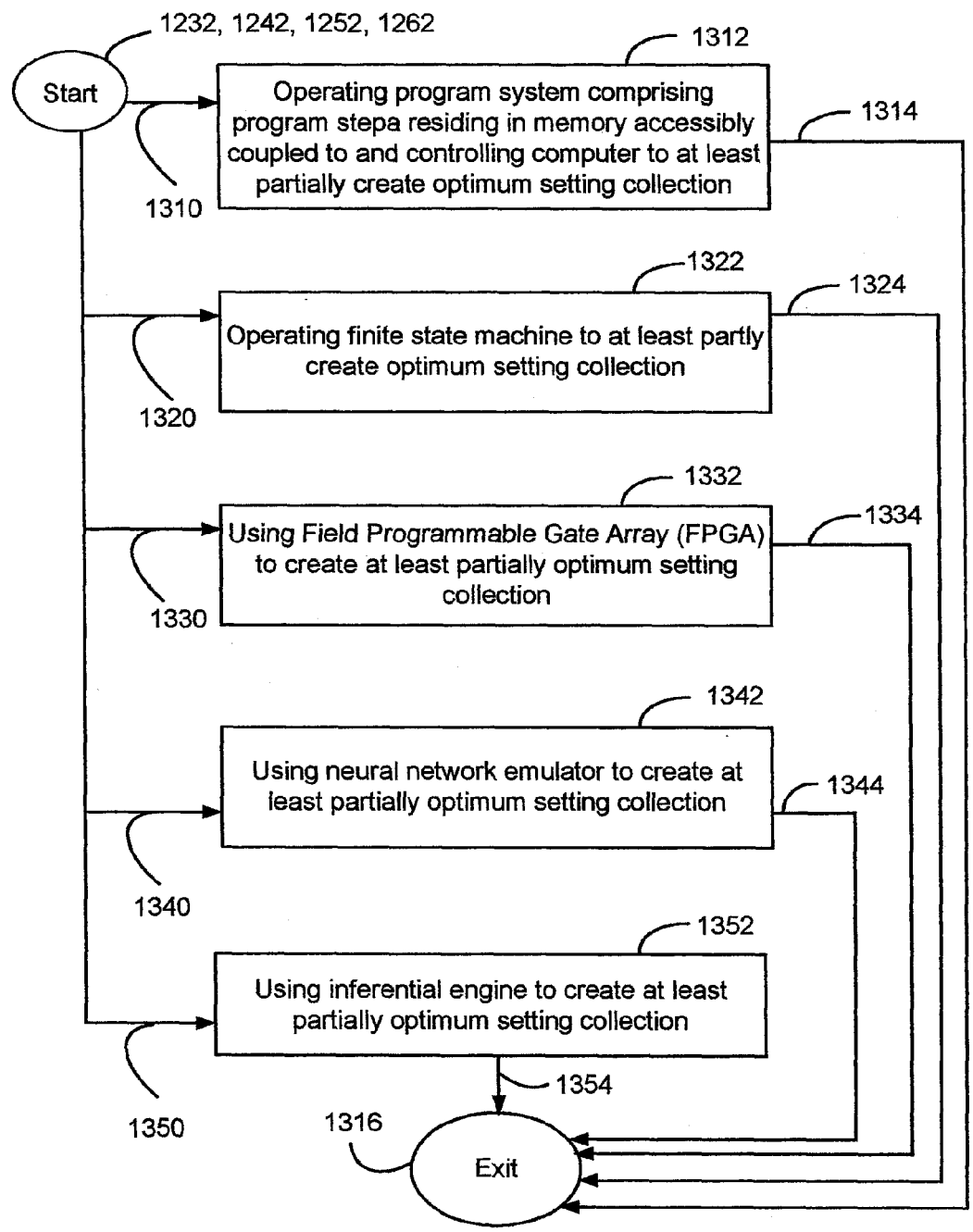
FIG. 12 illustrates a detail flowchart of at least one of operations 1132, 1142, 1152, and 1162, of FIG. 11 operated by a member of an optimizer implementation collection.

FIG. 12 illustrates a detail of at least one of operations 1232, 1242, 1252, and 1262, of FIG. 11 operated by a member of an optimizer implementation collection.

The optimizer implementation collection includes operations 1312, 1322, 1332, 1342, and 1352.

Means, operation 1312 performs the setting optimizer collection member, which includes operating a program system comprising at least one program step residing in a memory accessibly coupled to and controlling a computer to at least partially create the optimum setting collection.

Means, operation 1322 performs the setting optimizer collection member, which includes operating a finite state machine to at least partly create the optimum setting collection.

Means, operation 1332 performs the setting optimizer collection member, which includes using at least one Field Programmable Gate Array (FPGA) to create at least partially the optimum setting collection.

Means, operation 1342 performs the setting optimizer collection member, which includes means for using a neural network emulator to create at least partially the optimum setting collection.

Means, operation 1352 performs the setting optimizer collection member, which includes means for using an inferential engine to create at least partially the optimum setting collection.

In certain situations, the radio link includes at least two of the receiver chains and at least two of the transmit chains.

Figure 13A:
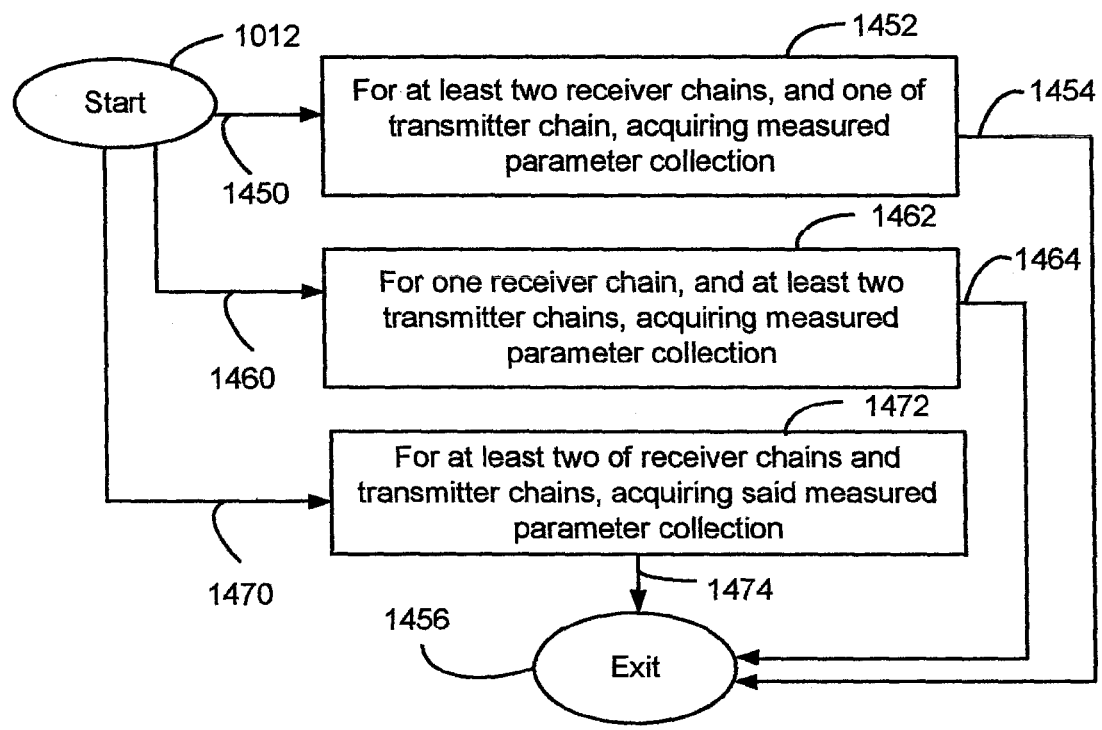
FIG. 13A illustrates a detail flowchart of operation 1012 of FIGS. 7 and 9A further acquiring the measured parameter collection, when the radio link includes at least two of the receiver chains and at least two of the transmit chains.

FIG. 13A illustrates a detail of means, operation 1012 of FIGS. 7 and 9A further acquiring the measured parameter collection, when the radio link includes at least two of the receiver chains and at least two of the transmit chains.

Means, operation 1452 performs for at least two of the receiver chains, and at least one of the transmitter chains, acquiring the measured parameter collection in the receiver chains and in the transmit chain, collectively involving the OSI layer one and the OSI layer two.

Means, operation 1462 performs for at least one of the receiver chains, and at least two of the transmitter chains, acquiring the measured parameter collection in the receiver chain and in the transmit chains, collectively involving the OSI layer one and the OSI layer two.

Means, operation 1472 performs for at least two of the receiver chains, and at least two of the transmitter chains, acquiring the measured parameter collection in the receiver chains and in the transmit chains, collectively involving the OSI layer one and the OSI layer two.

Consider when, for at least one of the OSI link layers from at least the OSI layer three to the top layer, the optimum setting collection includes at least one member used to configure the OSI link layer.

Figure 13B:
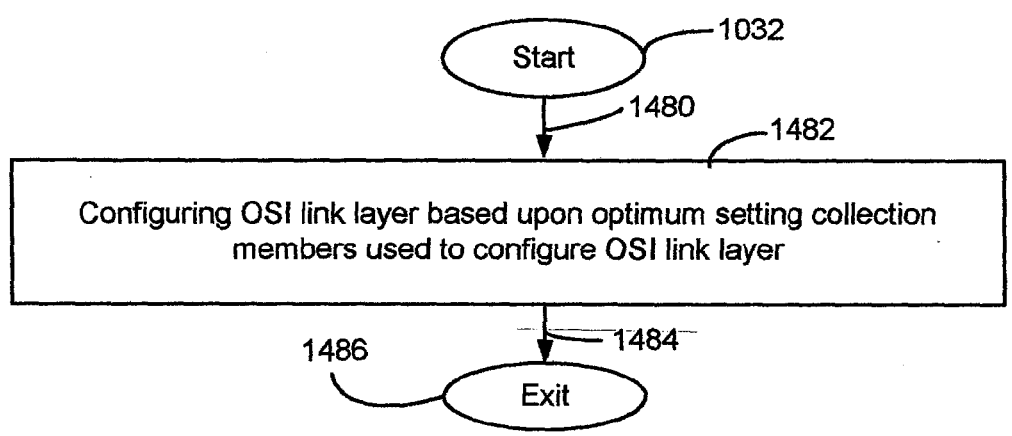
FIG. 13B illustrates a detail flowchart of operation 1032 of FIGS. 7 and 9A configuring OSI layer three to top layer, for OSI link layers for which optimum setting collection includes member used to configure OSI link layer.

FIG. 13B illustrates a detail of means, operation 1032 of FIGS. 7 and 9A configuring at least OSI layer three to top layer, for OSI link layers for which optimum setting collection includes the at least one member used to configure OSI link layer.

Means, operation 1482 performs configuring the OSI link layer based upon the optimum setting collection members used to configure the OSI link layer.

Figure 14A:
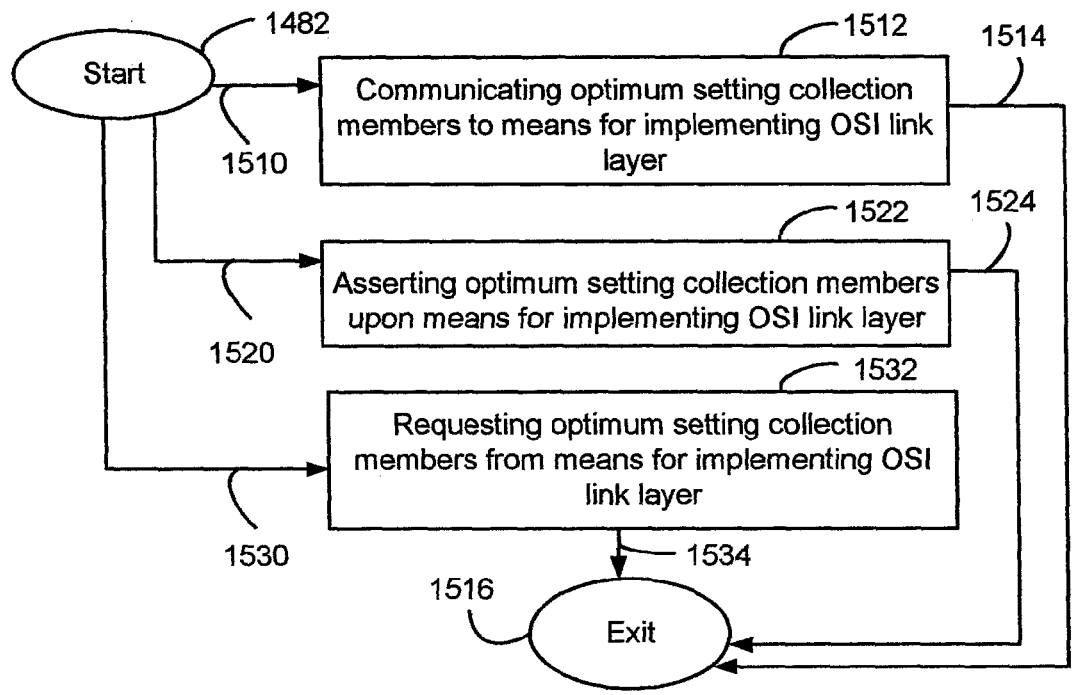
FIG. 14A illustrates a detail flowchart of operation 1482 of FIG. 13B further configuring the OSI link layer based upon the optimum setting collection members used to configure the OSI link layer as one of the operations of this flowchart.

FIG. 14A illustrates a detail of means, operation 1482 of FIG. 13B further configuring the OSI link layer based upon the optimum setting collection members used to configure the OSI link layer as one of the operations of this flowchart.

Means, operation 1512 communicates the optimum setting collection members to a means for implementing the OSI link layer.

Means, operation 1522 asserts the optimum setting collection members upon a means for implementing the OSI link layer.

Means, operation 1532 requests the optimum setting collection members from the means for implementing the OSI link layer.

Figure 14B:
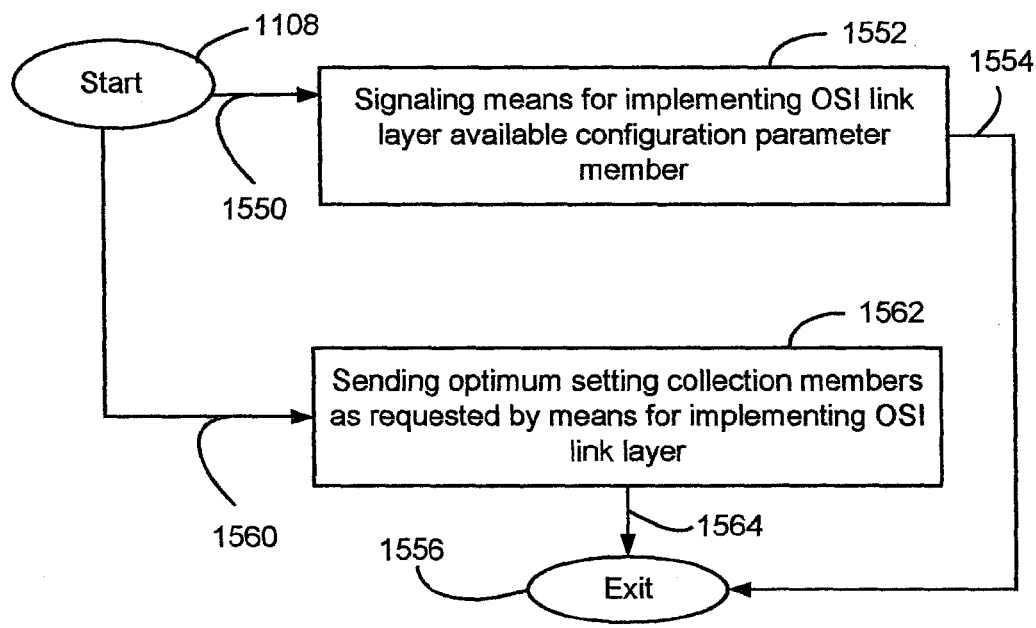
FIG. 14B illustrates a detail flowchart of operation 1512 of FIG. 14A further communicating the optimum setting collection members used to configure the OSI link layer to the means for implementing the OSI link layer.

FIG. 14B illustrates a detail of means, operation 1512 of FIG. 14A further communicating the optimum setting collection members used to configure the OSI link layer to the means for implementing the OSI link layer.

Means, operation 1552 signals the means for implementing the OSI link layer of an available configuration parameter member.

Means, operation 1562 sends the optimum setting collection members as requested by the means for implementing the OSI link layer.

Figure 15A:
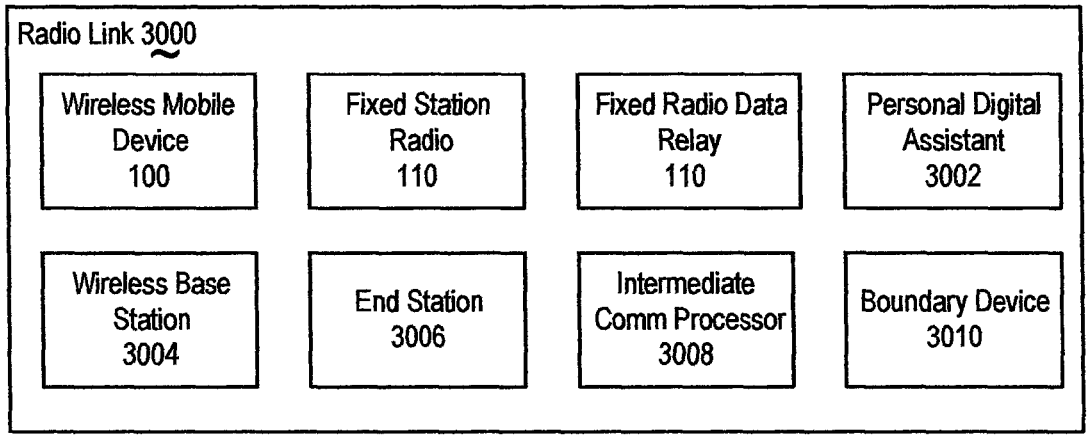
FIG. 15A illustrates various radio links 3000, which may be optimized by the invention.

FIG. 15A illustrates various radio links 3000, which may be optimized by the invention.

In FIG. 15A, a radio link refers to the following. A wireless mobile device 100 as illustrated in FIG. 1. A fixed station radio 110 and/or a fixed radio data relay 110 as illustrated in FIG. 2. A personal digital assistant 3002 with wireless communications capabilities. A wireless base station 3004. An end station attached to a wireless network 3006. An intermediate communications processor with a wireless communication capability 3008. And a boundary device optimizing encapsulation between two members of a communication protocol collection 3010.

Note that at least one member of the communication protocol collection preferably supports a wireless physical transport at the OSI layer one.

Note that in many situations it is preferable that for each of the OSI link layers from the OSI layer three to the top layer, the optimum setting collection includes at least one member used to configure the OSI link layer.

Figure 15B:
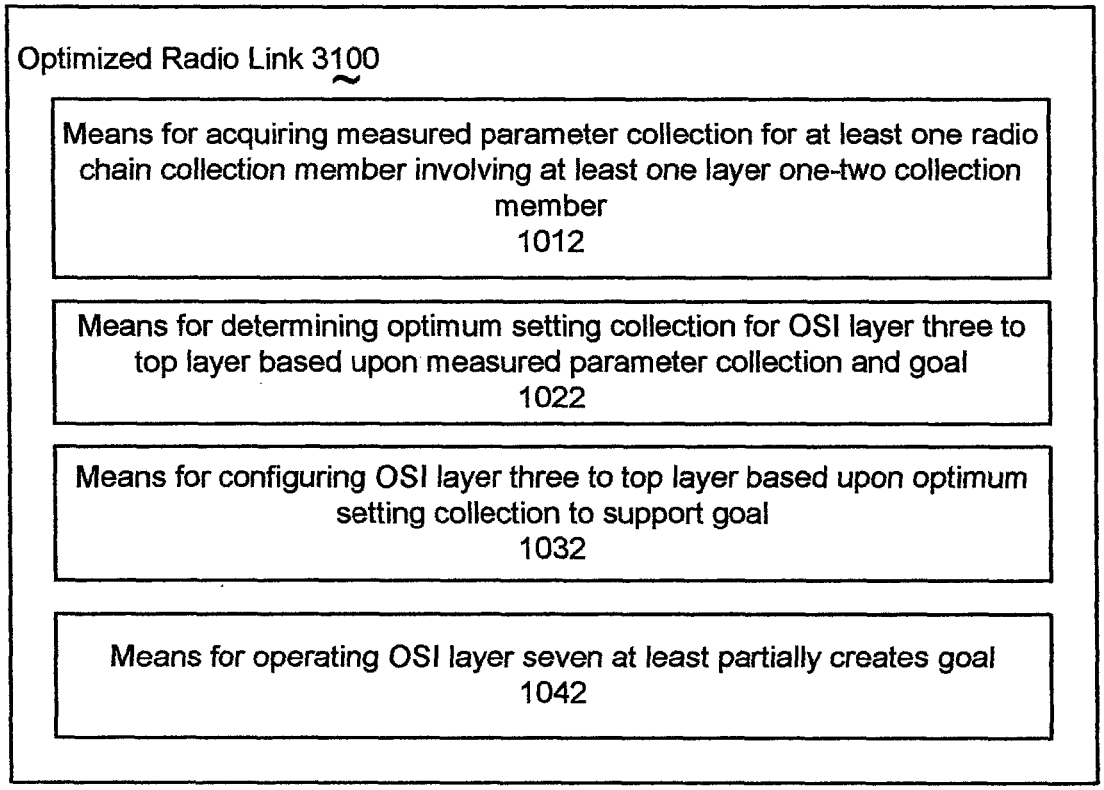
FIG. 15B illustrates an optimized radio link 3100, made by method 3300 to be illustrated in FIG. 16, from a radio link 3000 as illustrated in FIG. 15A.
Figure 16:
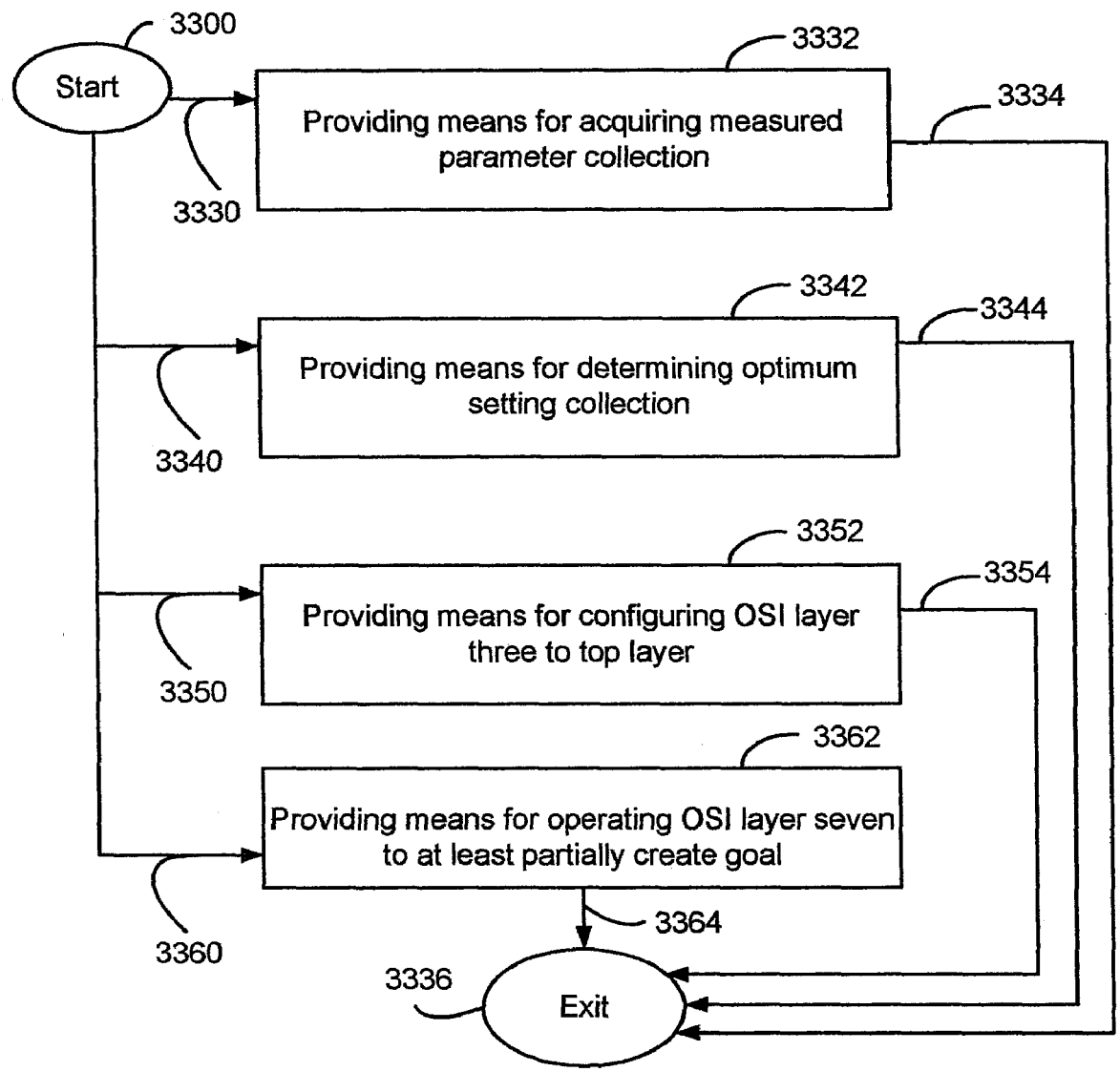
FIG. 16 illustrates a method 3300 of making of the optimized radio link 3100 of FIG. 15B from a radio link 3000 of FIG. 15A.

FIG. 15B illustrates an optimized radio link 3100, made by method 3300 to be illustrated in FIG. 16, from a radio link 3000 as illustrated in FIG. 15A.

In FIGS. 7 and 15B, 1012 illustrates a means for acquiring a measured parameter collection including at least one measured parameter for at least one member of a radio chain collection involving at least one member of a layer one-two collection including the OSI layer one and an OSI layer two.

In FIGS. 7 and 15B, 1022 illustrates a means for determining an optimum setting collection for an OSI layer three to the top layer based upon the measured parameter collection and based upon a goal.

In FIGS. 7 and 15B, 1032 illustrates a means for configuring the OSI layer three to the top layer based upon the optimum setting collection to support the goal. FIG. 7 illustrates a means for configuring the OSI layer three to top layer.

In certain preferred embodiments the top layer is at least an OSI layer five and at most an OSI layer seven. In certain further preferred embodiments, the top layer is essentially the OSI layer seven.

When the top layer is the OSI layer seven, in FIGS. 7 and 15B, 1012 illustrates a means for operating the OSI layer seven at least partially creating the goal.

FIG. 16 illustrates a method 3300 of making the optimized radio link 3100 of FIG. 15B from a radio link 3000 of FIG. 15A.

Operation 3332 provides a means for acquiring the measured parameter collection.

Operation 3342 provides a means for determining the optimum setting collection.

Operation 3352 provides a means for configuring at least the OSI layer three to the top layer.

When the radio link 3000 includes a top layer of essentially the OSI layer seven, operation 3362 provides a means for operating the OSI layer seven to, at least partially, create the goal.

The optimized radio link is a product of the process outlined in FIG. 16.

Figure 17A:
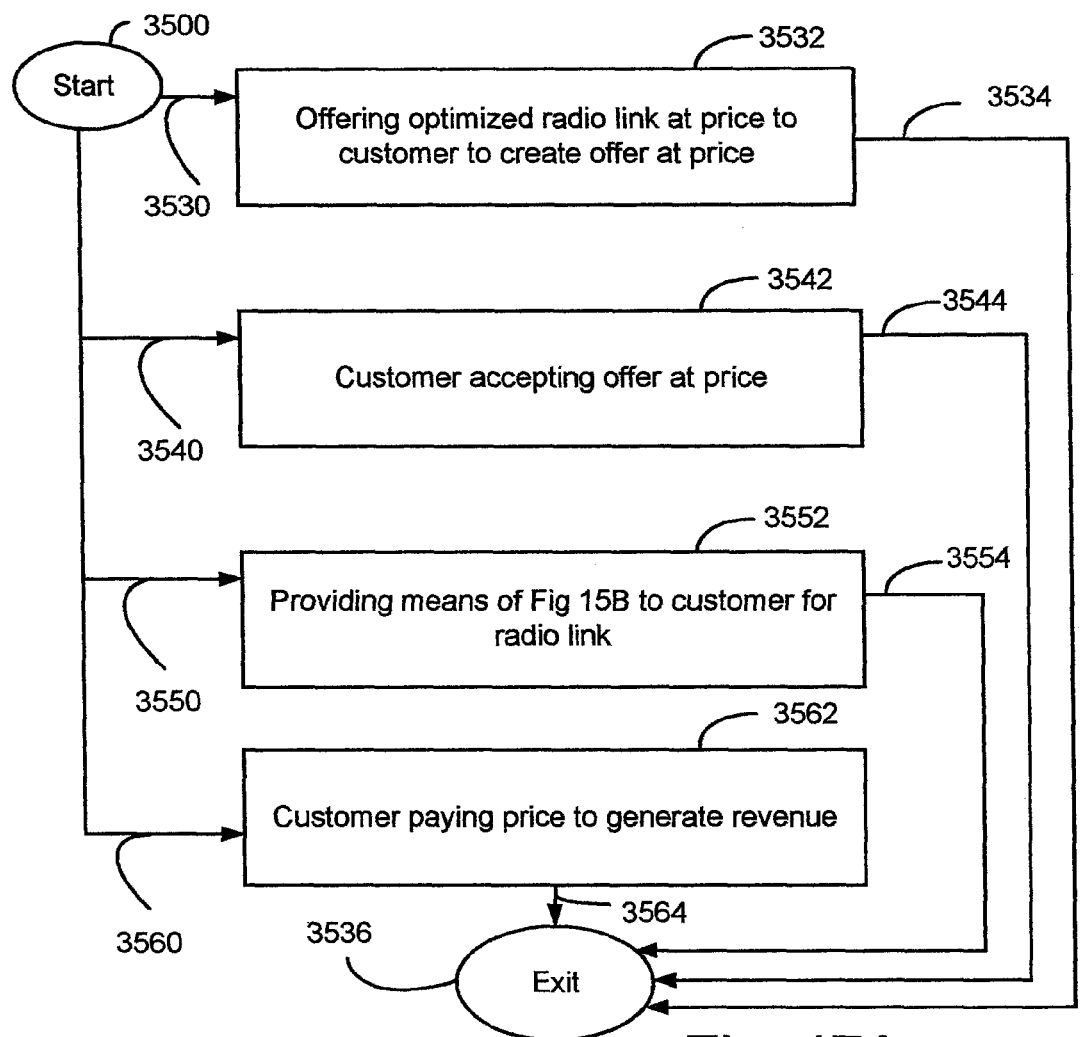
FIG. 17A illustrates a method 3500 of generating revenue 3510 of FIG. 17B based upon optimized radio link 3100 of FIG. 15B.
Figure 17B:
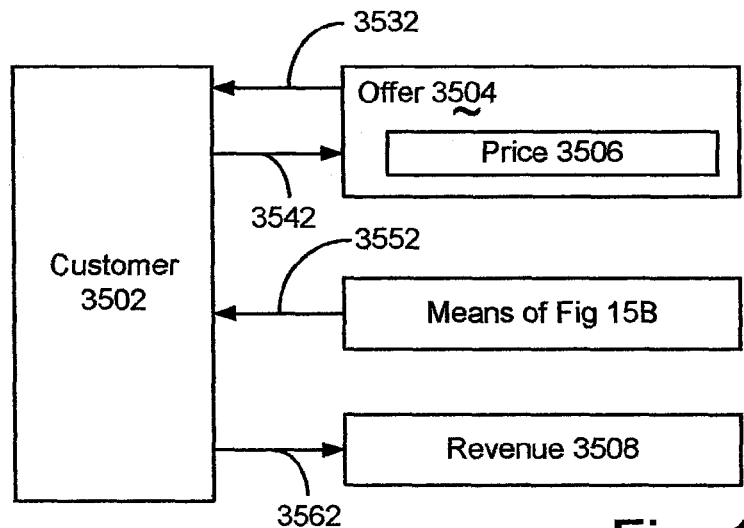
FIG. 17B illustrates the transactions of FIG. 17A between customer 3502, offer 3504, including price 3506, the means of FIG. 15B, and revenue 3508.

FIG. 17A illustrates a method 3500 of generating revenue 3510 of FIG. 17B based upon optimized radio link 3100 of FIG. 15B.

FIG. 17B illustrates the transactions of FIG. 17A between customer 3502, offer 3504, including price 3506, the means of FIG. 15B, and revenue 3508.

In FIGS. 17A and 17B, operation 3532 performs offering the optimized radio link 3100 of FIG. 15B at a price 3506 of FIG. 17B to customer 3502 to create an offer 3504 at the price 3506.

In FIGS. 17A and 17B, operation 3542 performs the customer 3502 accepting the offer 3504 at the price 3506.

In FIGS. 17A and 17B, operation 3552 provides the means of FIG. 15B to the customer 3502 for the radio link 3000 of FIG. 15A.

In FIGS. 17A and 17B, operation 3562 performs the customer 3502 paying the price 3506 to generate the revenue 3508.

Note that revenue 3508, is a product of the process of FIGS. 17A and 17B, based upon making the optimized radio link 3100 of FIG. 15A. Revenue 3508 is a product of at least one of the invention's methods.

Providing the means of FIG. 15B may include, but is not limited to, any the following: access to a download site for the means, a public key to decode the means, a memory device containing the means, and an initialization process for installing the means.

Figure 18A:
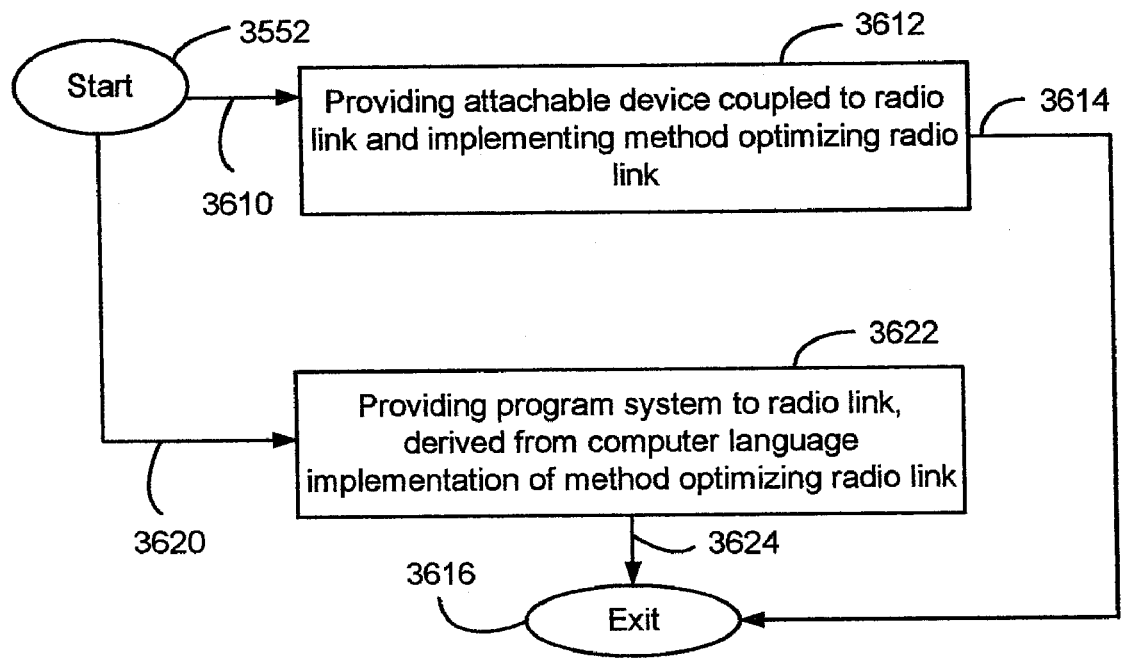
FIG. 18A illustrates a detail flowchart of operation 3552 of FIGS. 17A and 17B, further providing the means as at least one of the operations of this flowchart, which are the members of the means provider collection.

FIG. 18A illustrates a detail flowchart of operation 3552 of FIGS. 17A and 17B, further providing the means as at least one of the operations of this flowchart, which are the members of the means provider collection.

Operation 3612 provides an attachable device 200 and/or 600 of FIGS. 1 and 2, coupled to radio link 3000 of FIG. 15A, optimizing radio link 3000.

Operation 3622 provides a program system 1000 to radio link 3000 of FIG. 15A, derived from a computer language implementation of method optimizing radio link illustrated in FIGS. 1 to 16, excepting FIG. 5.

Figure 18B:
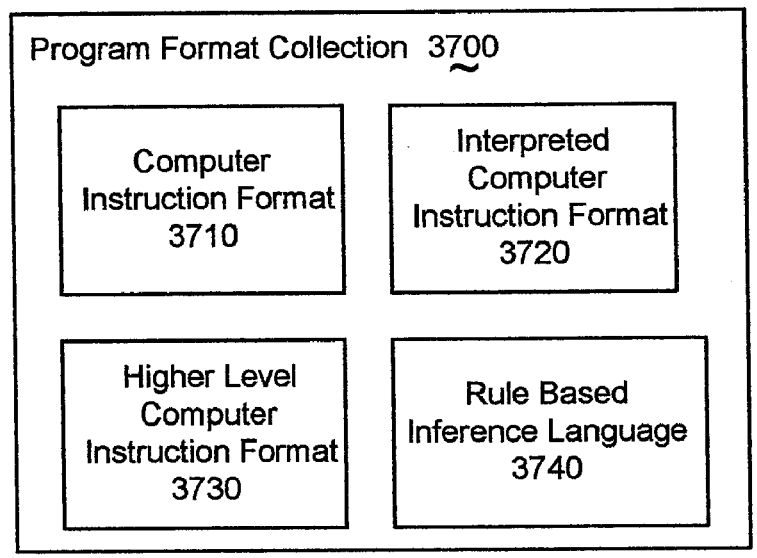
FIG. 18B illustrates the program format collection 3700 including a version of a computer instruction format 3710, a version of an interpreted computer instruction format 3720, a version of a higher level computer instruction format 3730, and a version of a rule based inference language 3740.

The program steps of program system 1000 of FIG. 8A are implemented in a version of at least one member of a program format collection 3700 illustrated in FIG. 18B.

FIG. 18B illustrates the program format collection 3700 including a computer instruction format 3710, an interpreted computer instruction format 3720, a higher level computer instruction format 3730, and a rule based inference language 3740.

Figure 19A:
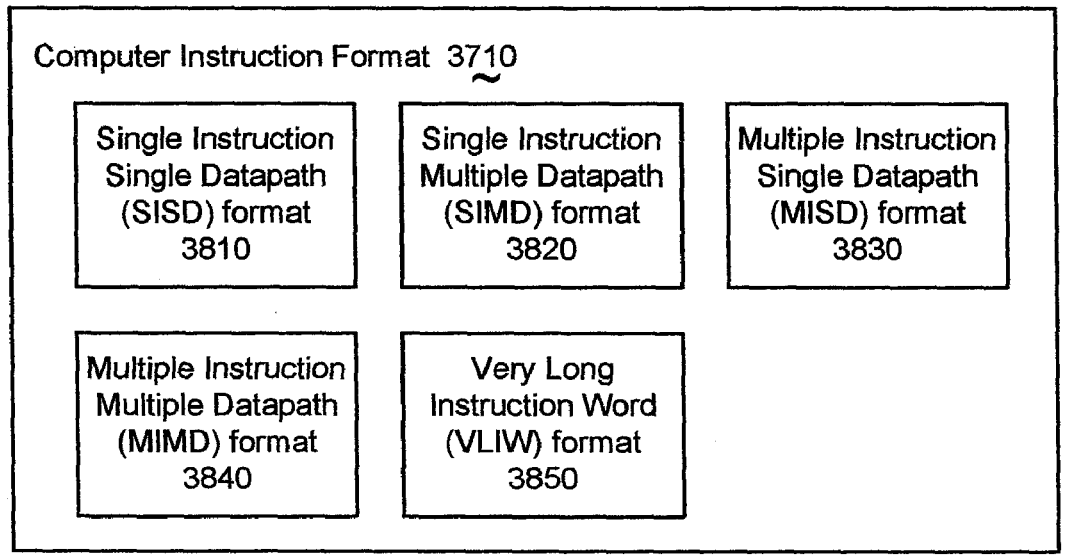
FIG. 19A further illustrates computer instruction format 3710 of FIG. 18B.

FIG. 19A further illustrates computer instruction format 3710 of FIG. 18B.

A computer instruction format 3710 includes a Single Instruction Single Datapath (SISD) format 3810, a Single Instruction Multiple Datapath (SIMD) format 3820, a Multiple Instruction Single Datapath (MISD) format 3830, a Multiple Instruction Multiple Datapath (MIMD) format 3840, and a Very Long Instruction Word (VLIW) format 3850.

Figure 19B:
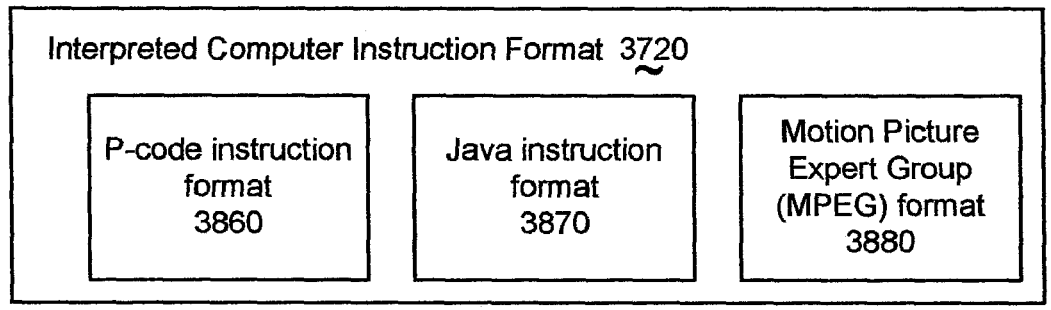
FIG. 19B illustrates interpreted computer instruction format 3720 of FIG. 18B as a member of the collection comprising a version of p-code instruction format 3860, a version of a java instruction format 3870, and a version of an Motion Picture Expert Group (MPEG) format 3880.

FIG. 19B illustrates interpreted computer instruction format 3720 of FIG. 18B as a member of the collection comprising a p-code instruction format 3860, a java instruction format 3870, and a Motion Picture Expert Group (MPEG) format 3880.

Figure 19C:
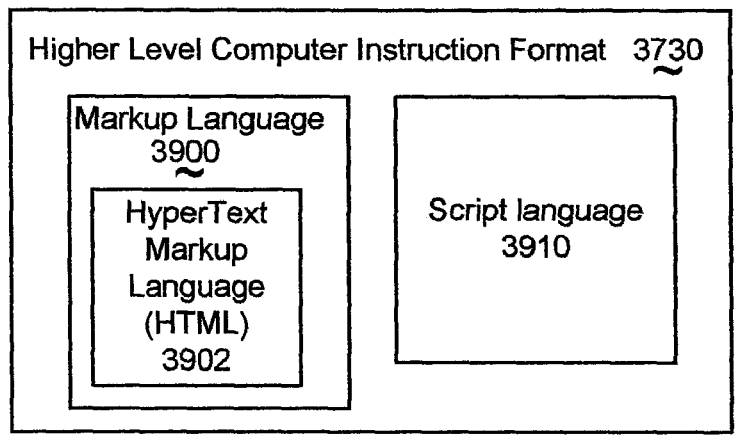
FIG. 19C illustrates higher level computer instruction format 3730 of FIG. 18B as a member of the collection comprising a Markup Language 3900, and a script language 3910.

FIG. 19C illustrates higher level computer instruction format 3730 of FIG. 18B as a member of the collection comprising a Markup Language 3900, and a script language 3910.

Note that a Markup Language 3900 includes at least a Hyper Text Markup Language (HTML) 3902.

Figure 20A:
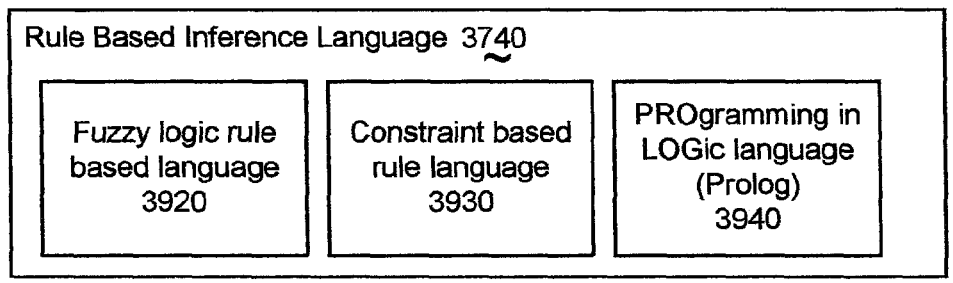
FIG. 20A illustrates rule based inference language 3740 of FIG. 18B as a member of a collection including a version of fuzzy logic rule based language 3920, a version of constraint based rule language 3930, and a version of PROgramming in LOGic language (Prolog) 3940.

FIG. 20A illustrates rule based inference language 3740 of FIG. 18B as a member of a collection including a fuzzy logic rule based language 3920, a constraint based rule language 3930, and a PROgramming in LOGic language (Prolog) 3940.

Figure 20B:
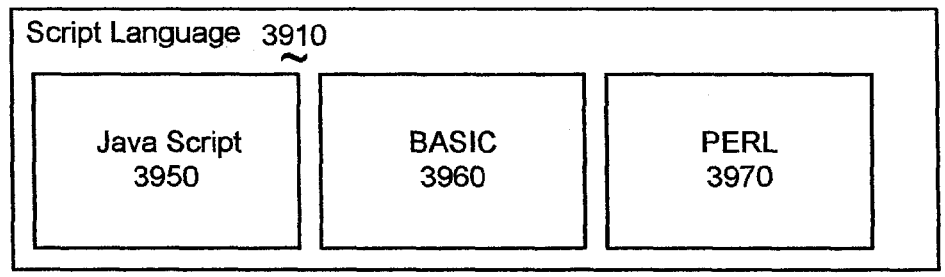
FIG. 20B illustrates script language 3910 of FIG. 19B including a version of java script 3950, a version of BASIC 3960, and a version of PERL 3970.

FIG. 20B illustrates script language 3910 of FIG. 19B including java script 3950, BASIC 3960, and PERL 3970.

Figure 21A:
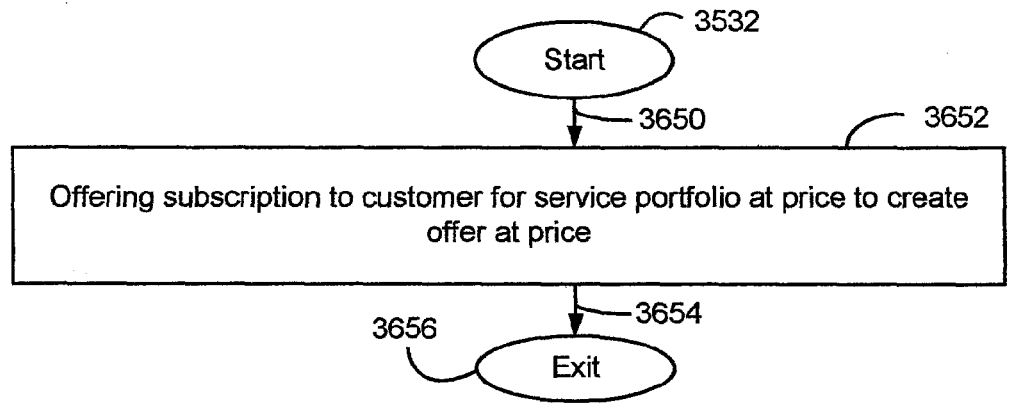
FIG. 21A illustrates a detail flowchart of operation 3532 of FIGS. 17A and 17B further offering to the customer at the price.

FIG. 21A illustrates a detail flowchart of operation 3532 of FIGS. 17A and 17B further offering to the customer at the price.

Operation 3652 performs offering a subscription to the customer 3502 for a service portfolio 3508 at the price 3506 to create the offer 3504 at the price 3506.

Figure 21B:
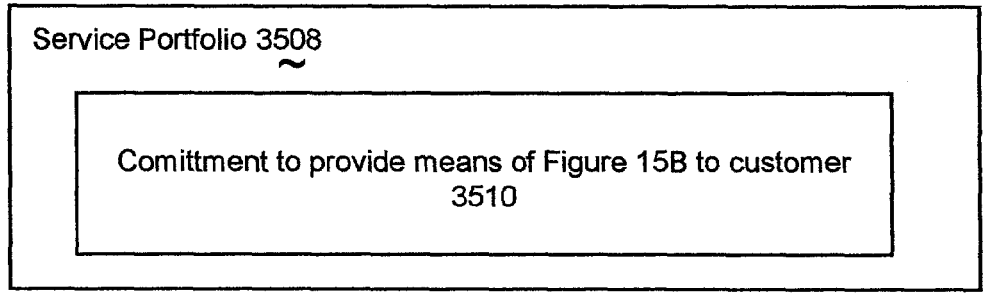
FIG. 21B illustrates service portfolio 3508 including a commitment 3510 to provide the means of FIG. 15B to the customer for the radio link

FIG. 21B illustrates service portfolio 3508 including a commitment 3510 to provide the means of FIG. 15B to the customer for the radio link. Note that the commitment to provide the means of FIG. 15B may include, but is not limited to, any the following: access to a download site for the means, a public key to decode the means, a memory device containing the means, and an initialization process for installing the means.

Consider the following example of the operation of an embodiment of the invention where the top layer is OSI layer seven. When the user of the Wireless Mobile device 100 of FIG. 1 wishes to communicate, optimized radio link 3100 determines the capabilities of the wireless network present in the current geographical proximity. This may be a high speed Local Area Network (LAN) that has been authorized to carry this users data, a lower speed/higher cost Metropolitan Area Network (MAN) or perhaps a Wide Area Network (WAN) such as a satellite.

Upon the selection of this RF Physical Layer link (Layer 1), messages are exchanged with intermediate nodes and the destination. The capabilities of the entire path and alternate paths are made available to the radio link optimizer 200. The invention's method 1042 selects the goal(s) 800 that provide the solution the user desires. These goals 800 may include, but are not limited to: quality of the video signal 814, monetary cost of the path 824, audio quality 826, minimization of local battery power 816, processing power 828, or end user capabilities. The optimization method 1000 also embodies an optimization based on any and all combinations of the options.

Should the user select the highest video quality and the RF physical Layer 1 allows a LAN connection, the result of the radio link optimizer method would be a sequence such as the following:

1. Establish a high bit rate video compression algorithm through Layers 5-7 (500).
2. Exchange messages at these layers with the destination indicating the connection requirements.
3. Optimize Layer 3 for LAN communications (510).
4. Provide security and authorization at Layer 2 with the LAN fixed station communications entities (520).
5. Negotiate frequency, data bandwidth reservation, and other physical parameters (530).
6. Establish receive requirements based on the amount of bandwidth able to be carried from the destination to the optimized radio link 3100.
7. Establish security and authorization for the receive path at Layer 2 with the LAN fixed station (560).
8. Optimize Layer 3 for receiving LAN communications (550).
9. Provide the proper parameters to the decompression and display device (540) for the receiving path.

In this preferred embodiment, the radio link optimizer method and apparatus has thorough information needed to optimize all parameters at all protocol layers.

The preceding embodiments have been provided by way of example and are not meant to constrain the scope of the following claims.

The invention claimed is:

1. A wireless mobile communications device, comprising:
a radio transceiver;
a communication processor operatively coupled to the radio transceiver; and
a radio link optimizer that is operatively coupled to the radio transceiver and the communication processor,
wherein the radio link optimizer acquires a measured parameter collection for at least one member of a radio chain collection that involves at least one measured parameter for at least a first layer of a communications protocol stack and a second layer of a communications protocol stack,
wherein the radio link optimizer determines an optimum setting collection for at least a third layer to a top layer of the communications protocol stack based upon at least the measured parameter collection and a goal,
wherein the radio link optimizer configures the third layer of the communications protocol stack to the top layer of the communications protocol stack based upon at least the determined optimum setting collection,
wherein the radio chain collection comprises a receiver chain and a transmitter chain that are part of the radio link, and
wherein the top layer of the communications protocol stack comprises at least a fourth layer of the communications protocol stack.

2. The wireless mobile communications device according to claim 1, wherein the wireless communications device supports video teleconferencing.

3. The wireless mobile communications device according to claim 1, wherein the top layer of the communications protocol stack implements a TCP layer.

4. The wireless mobile communications device according to claim 1, wherein the measured parameter collection comprises one or more of the following: a number of decoder iterations for the receiver chain, a transmit power level for the transmitter chain, and a handoff status.

5. The wireless mobile communications device according to claim 1, wherein the optimum setting collection comprises at least two of the following: an advertised window size, a transmit window size, a retransmission timer size, a data bit rate, a camera resolution, a display resolution, a display refresh rate, an audio power, a geographic positioning, a video compression, an IP packet size and a packet data unit.

6. The wireless mobile communications device according to claim 5, wherein the geographic positioning supports a cell hand off.

7. The wireless mobile communications device according to claim 1, wherein the goal comprises one or more of the following: a throughput goal, a latency goal, an end-to-end system delay goal, a transmitter power limit, a timeout limit, a visual clarity goal, a stored power duration, a minimized radio frequency (RF) bandwidth goal, a minimized data bandwidth goal, a minimized error rate goal, a monetary cost for communication goal, an audio quality goal and a processing power goal.

8. The wireless mobile communications device according to claim 1, wherein the radio link optimizer accesses a memory variable representing at least a member of the measured parameter collection.

9. The wireless mobile communications device according to claim 1, wherein the radio link optimizer receives an operating system message that at least partially indicates at least a member of the measured parameter collection.

10. The wireless mobile communications device according to claim 1, wherein the radio link optimizer receives a serialized communication that indicates at least a member of the measured parameter collection.

11. The wireless mobile communications device according to claim 1, wherein the radio link optimizer receives a parallelized communication that indicates at least a member of the measured parameter collection.

12. The wireless mobile communications device according to claim 1, wherein the radio link optimizer stimulates a neural network with the measured parameter collection.

13. The wireless mobile communications device according to claim 1, wherein the radio link optimizer comprises an inferential engine for use with the measured parameter collection.

14. The wireless mobile communications device according to claim 1, wherein the radio link optimizer uses fuzzy logic with respect to the measured parameter collection.

15. The wireless mobile communications device according to claim 1, wherein the radio link optimizer executes an optimization program.

16. The wireless mobile communications device according to claim 1, wherein the radio link comprises at least two receiver chains and at least two transmitter chains.

17. The wireless mobile communications device according to claim 16, wherein the at least two receiver chains or the at least two transmitter chains are part of the wireless mobile communications device.

18. The wireless mobile communications device according to claim 16, wherein the wireless communications comprises one or more of the following: wireless local area network communications, metropolitan area network communications, wide area network communications and cellular communications.

19. The wireless mobile communications device according to claim 16, wherein the at least two receiver chains or the at least two transmitter chains are part of a fixed wireless communications device.

20. The wireless mobile communications device according to claim 1, wherein the wireless mobile communications device is a personal digital assistant with wireless communications capabilities.

21. The wireless mobile communications device according to claim 1, wherein the wireless mobile communications device wherein the wireless mobile communications device supports intermediate wireless communications.

22. The wireless mobile communications device according to claim 1, wherein the top layer of the communications protocol stack comprises a fifth layer of the communications protocol stack, and wherein the top layer of the communications protocol stack is at most a seventh layer of the communications protocol stack.

23. The wireless mobile communications device according to claim 1, wherein the wireless mobile communications device supports one or more of the following: GSM communications, GPRS communications, WCDMA communications, CDMA2000 communications and HDR communications.

24. The wireless mobile communications device according to claim 1, wherein the wireless mobile communications device supports one or more of the following: Bluetooth communications, Hiperlan communications and communications based on an amendment to IEEE 802.11 specification.

* * * * *